(12) United States Patent  (10) Patent No.: US 6,734,653 B2
Taniguchi et al.                (45) Date of Patent:    May 11, 2004

(54) VOLTAGE REGULATOR FOR ALTERNATOR AND METHOD OF CONTROLLING POWER GENERATION OF ALTERNATOR

(75) Inventors: Makoto Taniguchi, Kariya (JP); Koji Tanaka, Anjo (JP); Toru Aoyama, Okazaki (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 169 days.

(21) Appl. No.: 09/973,848

(22) Filed: Oct. 11, 2001

(65) Prior Publication Data

US 2002/0043962 A1 Apr. 18, 2002

(30) Foreign Application Priority Data

Oct. 13, 2000 (JP) ........................... 2000-313726
Jun. 19, 2001 (JP) ........................... 2001-185446

(51) Int. Cl.⁷ ..................... H02H 7/06; H02P 11/00; H02P 9/00
(52) U.S. Cl. ..................... 322/24; 322/26; 322/28
(58) Field of Search ..................... 322/22, 24, 26, 322/28, 46

(56) References Cited

U.S. PATENT DOCUMENTS

| 4,602,205 | A | | 7/1986 | Matsuhashi et al. | ........ 323/216 |
| 4,658,200 | A | | 4/1987 | Kouge | ............... 322/25 |
| 4,831,322 | A | * | 5/1989 | Mashino et al. | ............ 322/28 |
| 5,497,071 | A | * | 3/1996 | Iwatani et al. | .............. 322/28 |
| 5,629,606 | A | * | 5/1997 | Asada | .................. 322/28 |
| 5,675,237 | A | * | 10/1997 | Iwatani | .............. 322/28 |
| 5,686,819 | A | * | 11/1997 | Iwatani et al. | .............. 322/25 |
| 5,886,500 | A | * | 3/1999 | Iwatani et al. | ............ 320/104 |
| 5,936,440 | A | * | 8/1999 | Asada et al. | ............ 327/110 |
| 6,014,016 | A | * | 1/2000 | Maruyama et al. | ........ 322/28 |
| 6,121,757 | A | * | 9/2000 | Takahashi et al. | .......... 322/28 |
| 6,191,562 | B1 | | 2/2001 | Mueller et al. | ............ 322/59 |
| 6,344,734 | B1 | * | 2/2002 | Iwatani et al. | ............ 322/28 |
| 6,462,517 | B2 | * | 10/2002 | Asada | .................. 322/28 |

FOREIGN PATENT DOCUMENTS

| DE | 199 35 260 A1 | 2/2000 |
| EP | 0 736 950 A1 | 10/1996 |
| JP | A 59-220030 | 12/1984 |
| JP | A 7-115738 | 5/1995 |

* cited by examiner

Primary Examiner—Burton S. Mullins
Assistant Examiner—Julio C. Gonzalez
(74) Attorney, Agent, or Firm—Oliff & Berridge PLC

(57) ABSTRACT

In an alternator, failure in a power supply line connected to an output terminal of a rectifier is detected. Upon detection of a failure in this power supply line, power generation is suppressed for a predetermined period that is longer than the time constant of a field winding of the alternator. Preferably, a high voltage pulse is detected to discriminate a first condition where a single high voltage pulse is generated when an electrical load connected to the power supply line is cut off and a second condition where a high voltage pulse is repeatedly and frequently generated when a failure occurs in the power supply line. Only when the second condition is discriminated, power generation suppression control of the alternator is conducted.

8 Claims, 21 Drawing Sheets

VOLTAGE REGULATOR FOR ALTERNATOR AND METHOD OF CONTROLLING POWER GENERATION OF ALTERNATOR

CROSS REFERENCE TO RELATED APPLICATION

This application is based on and incorporates herein by reference Japanese Patent Applications No. 2000-313726 filed Oct. 13, 2000 and No. 2001-185446 filed Jun. 19, 2001.

BACKGROUND OF THE INVENTION

The present invention relates to a voltage regulator for a vehicle alternator and a method of controlling the power generation of an alternator for a vehicle.

It is proposed in U.S. Pat. No. 6,191,562 (JP-A-2000-60191) to protect a power Zener diode of an alternator by improving a drive circuit of a power transistor so that magnetic energy is dispersed by making conductive the power transistor when electric load cut-off condition is generated. Thus, when a battery is cut off, supply of field current from the battery can be stopped.

However, it has been found that since high voltage is applied to the field winding of the alternator to increase a field current in the alternator of the structure to supply directly a field current from the DC output terminal of a full-wave rectifier of the alternator, the output voltage of the alternator is set in the positive feedback condition. Thereby, magnetic energy increases.

Moreover, when the battery is placed from the condition of being not completely cutoff, for example, to a condition where the harness is not perfectly fixed electrically at the output terminal of alternator, or a connection failure occurs anywhere in a power feeding cable, comparatively small surges of voltage are repeatedly applied to the power Zener diode irregularly within a short period. In this case, a large amount of heat accumulates because of the repetitive generation of heat, even though in comparatively small amounts. Therefore thermal damage becomes larger in this case than in the case where one comparatively large surge of voltage, such as that generated when a rated load is cut off or disconnected is applied.

FIG. 22 shows changes in temperature T when a reverse current I is repeatedly generated in the Zener diode. AC voltage is usually generated in the armature winding. Therefore this voltage becomes high, when a failure occurs. It thereby exceeds the reverse breakdown voltage Vz of the Zener diode, and the diode reverse breakdown allows a reverse current to flow. This is a rectangular wave current and the frequency thereof depends on the number of rotations of the rotor.

In this case, an instantaneous value of energy to be consumed in the Zener diode is given in the form of Vz·Iz (Iz is a reverse current flowing into one element). This energy is converted to heat and is classified into the energy accumulated in the thermal capacitance in proportion to the volume of element and the energy dispersed to the external side, with thermal resistance to be transferred through a member forming an element (such as electrode, soldering material and sealing material). Therefore, temperature instantaneously rises in comparison with the initial value T0 with the thermal energy accumulated in the element. Finally, when normal conditions are recovered and high voltage disappears, the reverse current is cut off and the temperature of the element is gradually lowered. In this case, if the high voltage condition is maintained for a long period of time, the temperature of the element continuously rises, resulting in the possibility of thermal breakdown of the element.

It is also proposed to increase the thermal capacitance by expanding the area of the diode element. However, mounting becomes difficult if such an increase of thermal capacitance is realized, because of the spatial limitation on the small size alternator. Moreover, it is also proposed that effective thermal dispersion can be realized by lessening thermal conductivity to the external circuits. However, it is likely that in a usual power generating operation temperature rises excessively due to radiation of heat from the external side.

Moreover, when normal diodes are used for the full-wave rectifier of the alternator, high voltage is not absorbed and appears on the power supply line. Accordingly, an electrical system protection device of a vehicle may be damaged.

SUMMARY OF THE INVENTION

The present invention therefore has an object to alleviate electrical and thermal damage to a rectifier of an alternator and a vehicle electrical system due to the high voltage that is repeatedly generated by the alternator.

According to the present invention, failure in a power supply line connected to an output terminal of a rectifier of an alternator is detected. Upon detection of a failure in this power supply line, power generation is suppressed for a predetermined period that is longer than the time constant of a field winding of the alternator.

When a high voltage pulse that is higher than a predetermined regulated voltage and exceeds a predetermined voltage that is lower than the withstand voltage of a rectifier built into an alternator appears at an output terminal of an alternator, this high voltage pulse is detected to discriminate a first condition where a single high voltage pulse is generated when an electrical load connected to the power supply line is cut off and a second condition where a high voltage pulse is repeatedly and frequently generated when a failure occurs in a power supply line or in a peripheral area. When the second condition is discriminated, power generation suppression control of the alternator is conducted.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
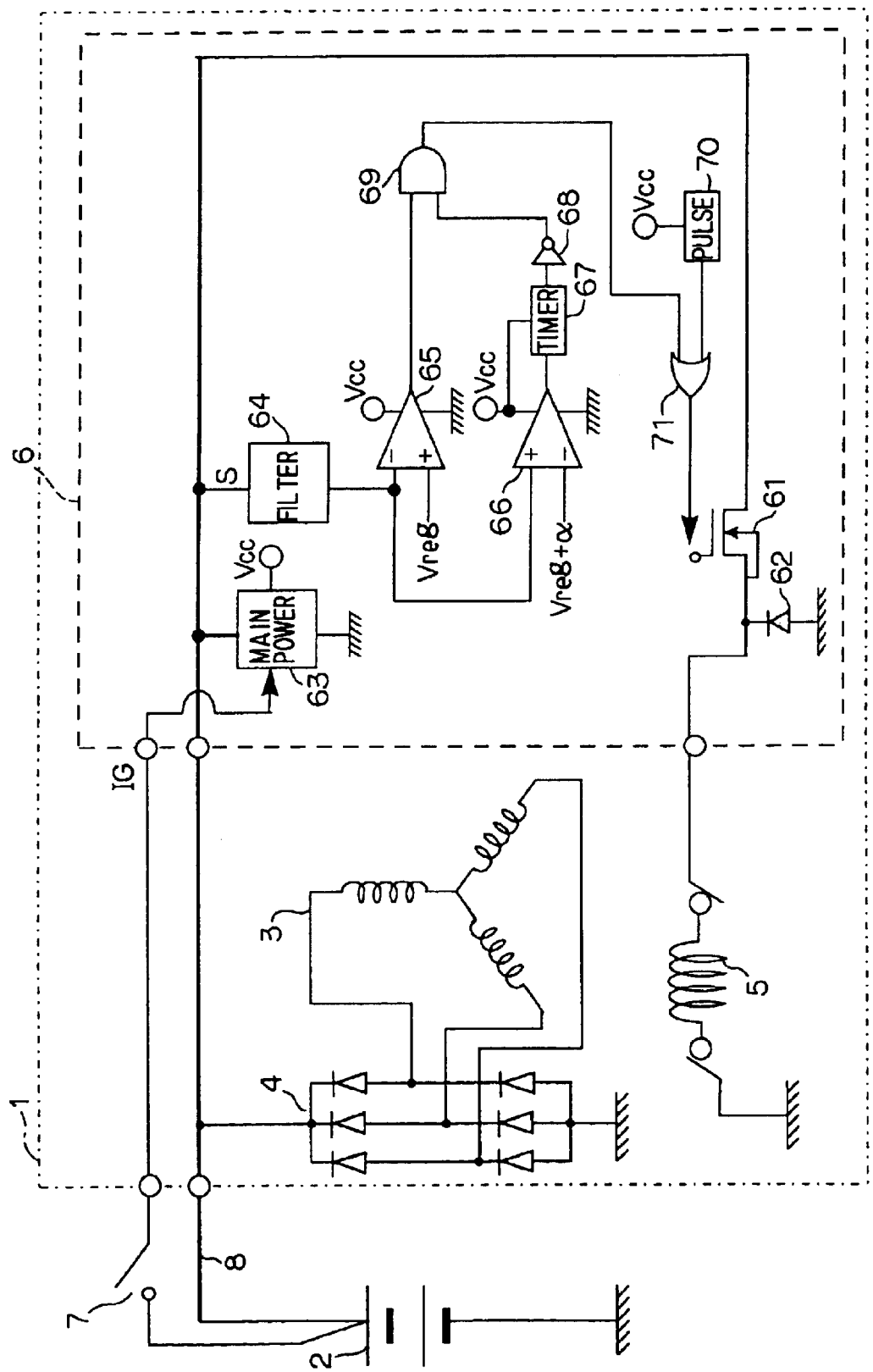
FIG. 1 is an electric wiring diagram showing an alternator for a vehicle according to a first embodiment of the present invention.

The preferred embodiments of the present invention will be explained with reference to various embodiments and modifications shown in the accompanying drawings.

First Embodiment

An alternator 1 for a vehicle comprises a three-phase armature winding 3, a full-wave rectifier 4, a field winding 5 and a voltage regulator 6. The full-wave rectifier 4 charges an on-board battery 2 through a power supply line 8 by converting AC output of the armature winding 3 to a DC output. The field winding 5 is wound about a rotor including a plurality of field poles to generate an inter-linkage magnetic flux to induce voltage and forms a field by applying a field current. The voltage regulator 6 adjusts DC output voltage of the alternator 1 for a vehicle to a predetermined voltage Vreg.

The voltage regulator 6 comprises a power transistor 61 reflux or flywheel diode 62, a main power supply circuit 63, a filter 64, a first comparator 65, a second comparator 66, a timer circuit 67, an inverter 68, an AND gate 69, a pulse generator 70, and an OR gate 71. The second comparator 66 is for detecting a failure, while the timer circuit 67 and AND gate 69 are for controlling or suppressing power generation.

The power transistor 61 is a switch means connected in series to the field winding 5 for ON/OFF-control of the field current flowing into the field winding 5. The flywheel diode 62 is a flywheel circuit connected in parallel with the field winding 5 to flywheel the field current when the power transistor 61 is turned off (opened). The main power supply circuit 63 detects the turning-on condition of an on-board key switch 7 to form the drive power supply, Vcc of the voltage regulator 6 from the on-board battery 2. The filter 64 absorbs harmonics noise superimposed on an output voltage of the full-wave rectifier 4. The first comparator 65 compares the output voltage of the filter 64 with the predetermined value vreg, and provides an inverted output when the output voltage of the alternator 1 is smaller than the predetermined value Vreg.

The second comparator 66 compares the output of the filter 64 with the predetermined value Vreg+α, and provides an inverted output when the output voltage of the alternator 1 exceeds the predetermined value Vreg+α. The timer circuit 67 inputs the output signal of the second comparator 66 and provides an inverted output only for the predetermined period from a rising edge of the output signal of the second comparator 66. This predetermined period is set longer than the time constant of the field winding 5. The inverter 68 inverts the output signal of the timer circuit 67. The AND gate 69 produces a logical product of the output of the first comparator 65 and the output of the inverter 68. The pulse generator 70 generates a clock pulse of low duty ratio. The OR gate 71 produces a logical sum of the output of the AND gate 69 and the output of the pulse generator 70. The power transistor 61 is turned on and off with the output signal of the OR gate 71.

Next, operations of the voltage regulator 6 of this embodiment will be explained.

When the output voltage of the full-wave rectifier 4 is in the range not exceeding Vreg+α, namely when no failure occurs in the power supply line 8, the output of the inverter 68 becomes high level and therefore the power transistor 61 is driven in the ordinary voltage control operation.

When a certain failure occurs in the power supply line 8, for example, when a contact failure occurs at the connecting point, a sharp high voltage surge is generated frequently. In this case, if this high voltage surge is not absorbed with the filter 64 and is then inputted to the second comparator 66, the second comparator 66 starts the timer circuit 67. During operation of this timer circuit 67, it is preset to output the high level signal. Therefore, since output of the AND gate 69 is maintained in the low level during this period and the signal of the pulse generator 70 of low duty ratio becomes valid as a drive signal for the power transistor 61, the power transistor 61 is driven with the output signal of this pulse generator 70 to control the supply of the field current. This low duty ratio is preferably from several percent to tens of percent.

The field current flowing into the field winding 5 is rapidly attenuated because magnetic energy thereof is converted to thermal energy with a resistance of the field winding 5 through the flywheel diode 62. Since the preset period of the timer circuit 67 is longer than the time constant of the field winding 5, an average value of the field current becomes small and power generation is controlled to the amount to maintain the driving of the main power supply circuit 63. Thereby, charging of the battery 2 is almost stopped. When the timer circuit 67 stops the operation thereof, the inverter 68 outputs the high level signal. Here, the output voltage of the alternator 1 is lowered because it has controlled power generation. Therefore, the first comparator 65 provides an inverted output to turn on the power transistor 61. Thereby, power generation is started again. In this case, output voltage exceeds again the value Vreg+α. The above cycle is repeated to delay the progress of damage of the defective area of the power supply line 8. Moreover, since chances of generating a high voltage can be reduced, electromagnetic damage to the electrical systems of a vehicle can also be controlled.

First Modification

Figure 2:
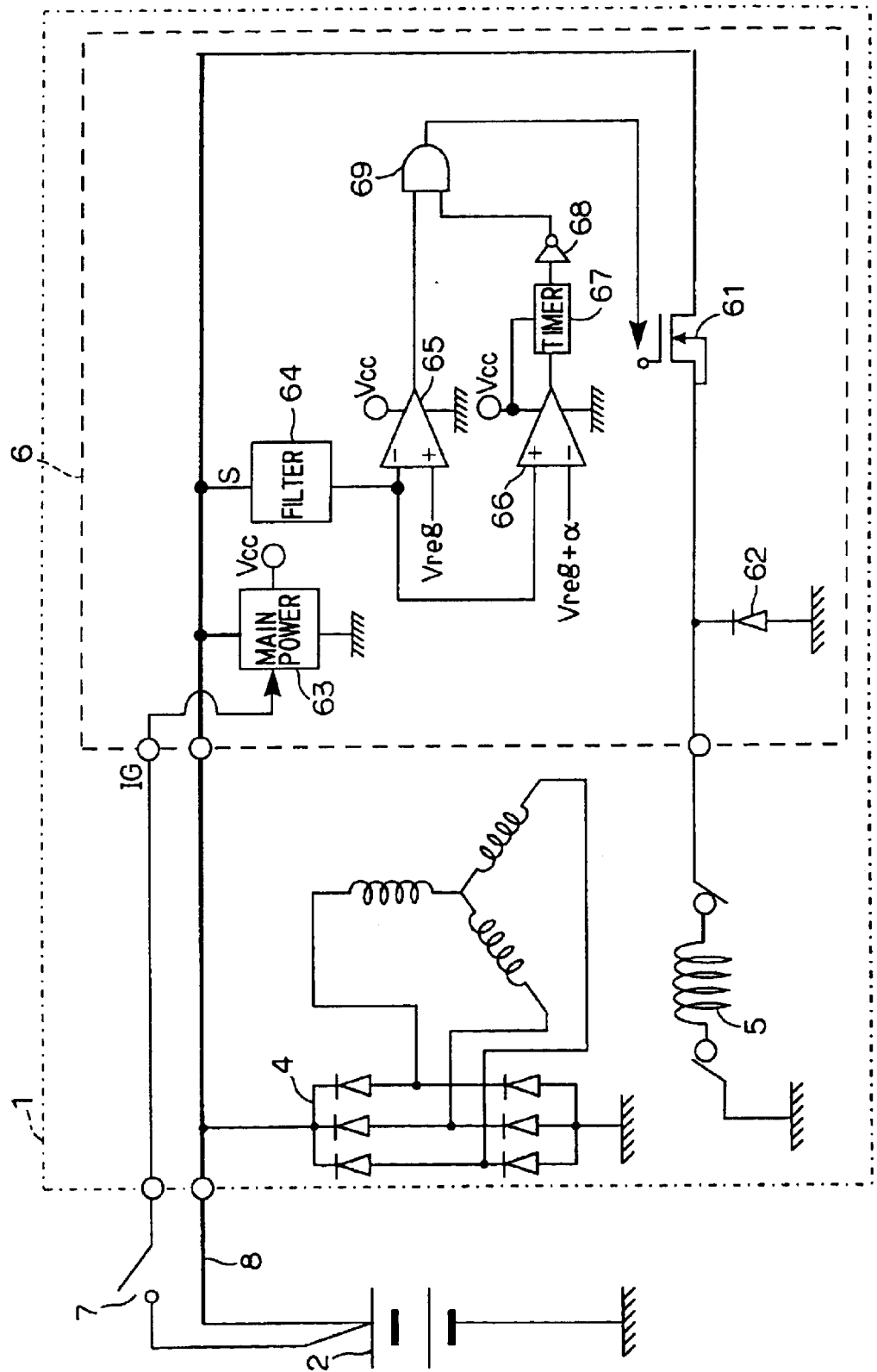
FIG. 2 is an electric wiring diagram showing a first modification of the first embodiment.

The first modification of the first embodiment will be explained with reference to FIG. 2.

In this modification, the power transistor 61 is driven with the output signal of the AND gate 69, except for the pulse generator 70 of low duty ratio and the OR gate 71, from the voltage regulator 6 of the first embodiment.

If a certain failure is detected in the power supply line 8, namely when the timer circuit 67 is in the operative condition, the power transistor 61 is completely turned off and therefore supply of the field current is stopped. The field current flowing into the field winding 5 rapidly attenuates because the magnetic energy thereof is converted to thermal energy with the resistance of the field winding 5 through the flywheel diode 62. Since the preset period of timer circuit 67 is longer than the time constant of the field winding 5, power generation is not started again until the field current disappears completely. Thereafter, when the timer circuit 67 stops operation, the inverter 68 outputs a high level signal. Here, the output voltage of the alternator 1 is lowered because it has stopped the power generation. Therefore, the first comparator 65 provides an inverted output to turn on the power transistor 61. Thereby, the power generation is started again. In this case, when output voltage exceeds Vreg+α, the cycle explained above is repeated to delay progress of damage on the defective area of the power supply line 8. Moreover, chances for generating high voltage can be reduced, and damage on the electric systems of vehicle can be controlled.

Second Modification

Figure 3:
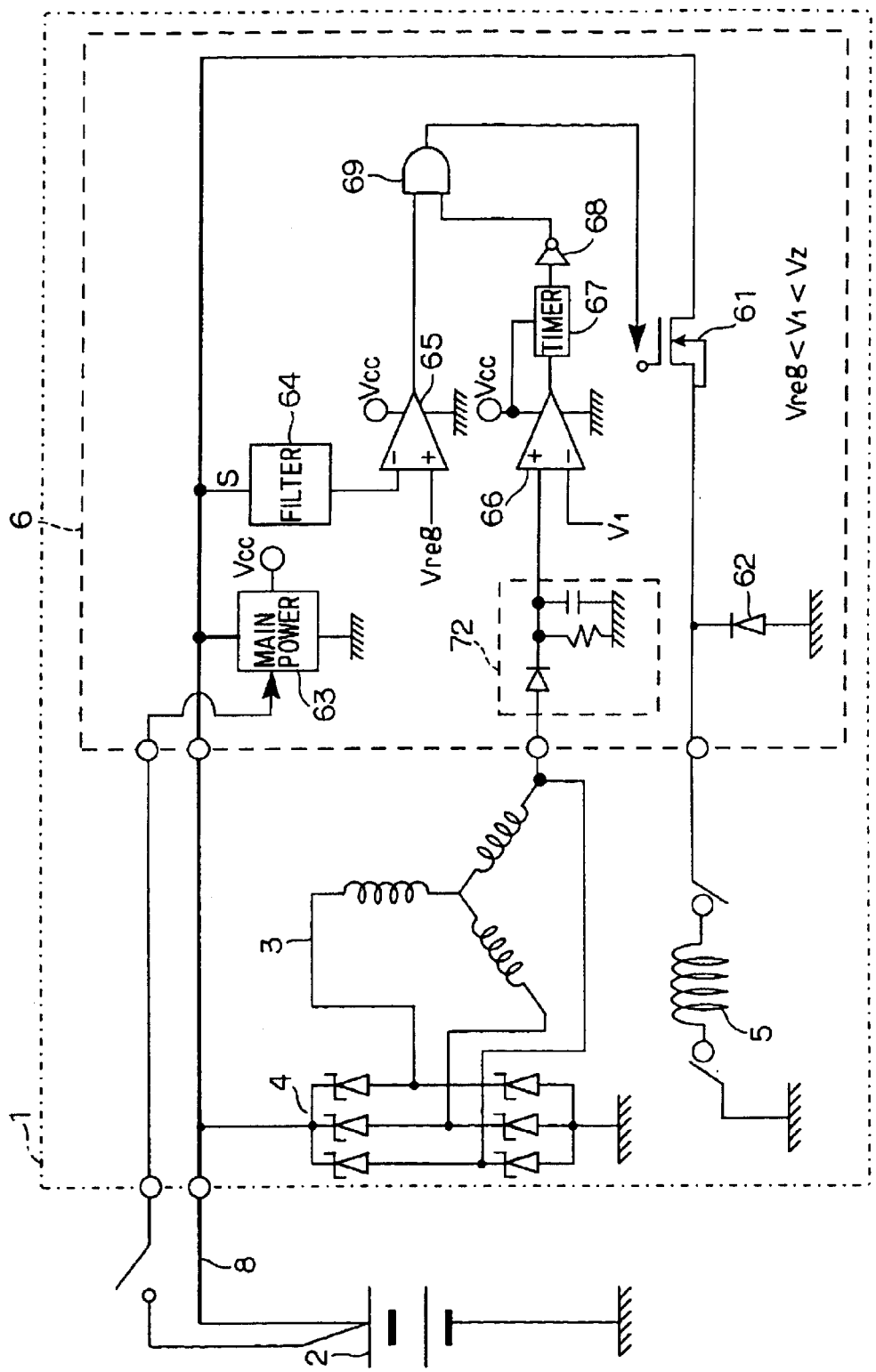
FIG. 3 is an electric wiring diagram showing a second modification of the first embodiment.

FIG. 3 shows a second modification of the first embodiment.

In this modification, unlike the first modification, the full-waver rectifier 4 is formed of Zener diodes having the reverse breakdown characteristic to absorb the high voltage surge.

The voltage regulator 6 is provided with a filter 72 for detecting the peak value of output voltage of the armature winding 3, and this peak value is compared with a threshold value V1, that is larger than the regulated voltage Vreg, and is smaller than the reverse breakdown voltage Vz of the Zener diode.

When a failure occurs in the power supply line 8, a high voltage surge exceeding the reverse breakdown voltage of the Zener diode is never outputted from the alternator 1. However, the larger the high voltage surge absorbed with the Zener diode is, the greater the thermal damage accumulated in the Zener diode becomes.

Figure 7:
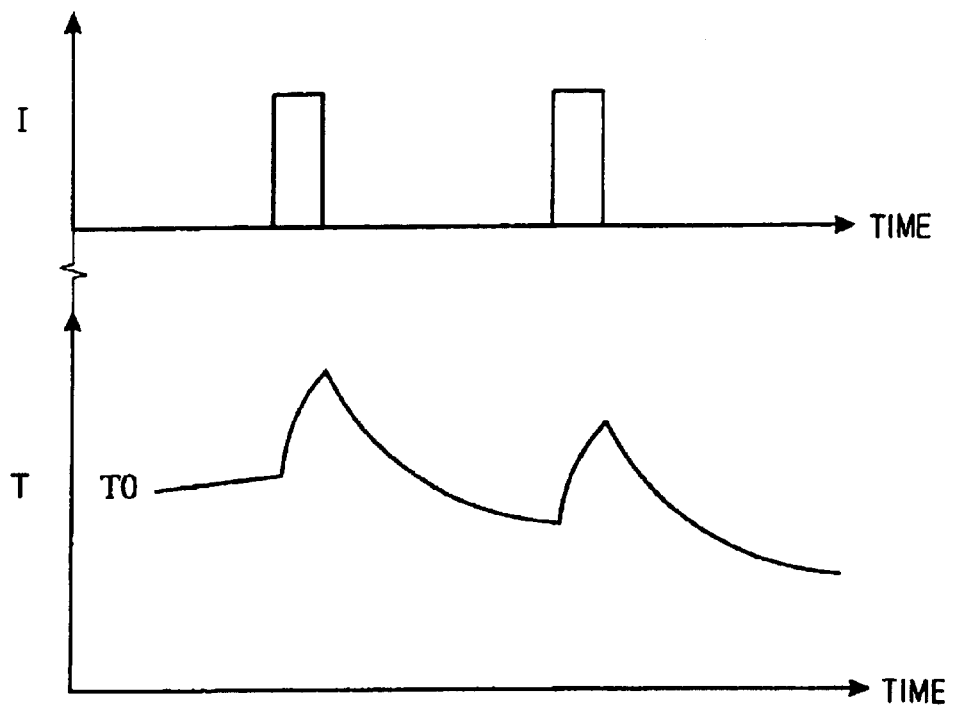
FIG. 7 is a characteristic diagram showing temperature rise of a Zener diode forming a full-ware rectifier in the first embodiment and its modifications.
Figure 22:
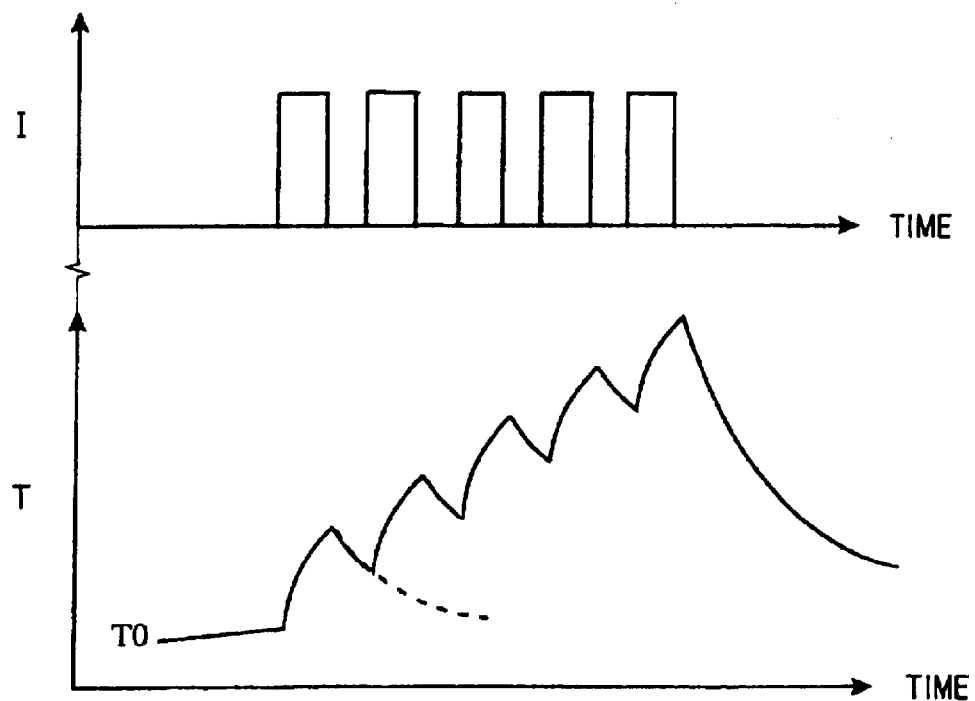
FIG. 22 is a characteristic diagram showing a temperature rise of a Zener diode in a conventional alternator.

According to this modification, when a voltage exceeding V1 is generated in the armature winding 3, the second comparator 66 provides an inverted output to turn off the power transistor 61 after the magnetic energy accumulated in the field winding 5 is completely attenuated, power generation is started again. Therefore, since the heat generated in the Zener diode is sufficiently transferred to the external side, temperature rise due to the reverse breakdown of the Zener diode is eliminated. This process is shown in FIG. 7. Temperature rise occurs once due to the reverse current I of Zener diode caused by high voltage. Since power generation is immediately stopped, the reverse current I no longer continues. Therefore, thermal energy generated in the element is released to the external side via the structural members. After the timer circuit 67 stops operation, the reverse current I flows again but power generation is immediately stopped. As a result, the element temperature T reaches a value lower than the initial temperature T0. This temperature T is of course never lower than the external temperature. owing to such a control, thermal damage of the Zener diode can be controlled to a small extent.

Third Modification

Figure 4:
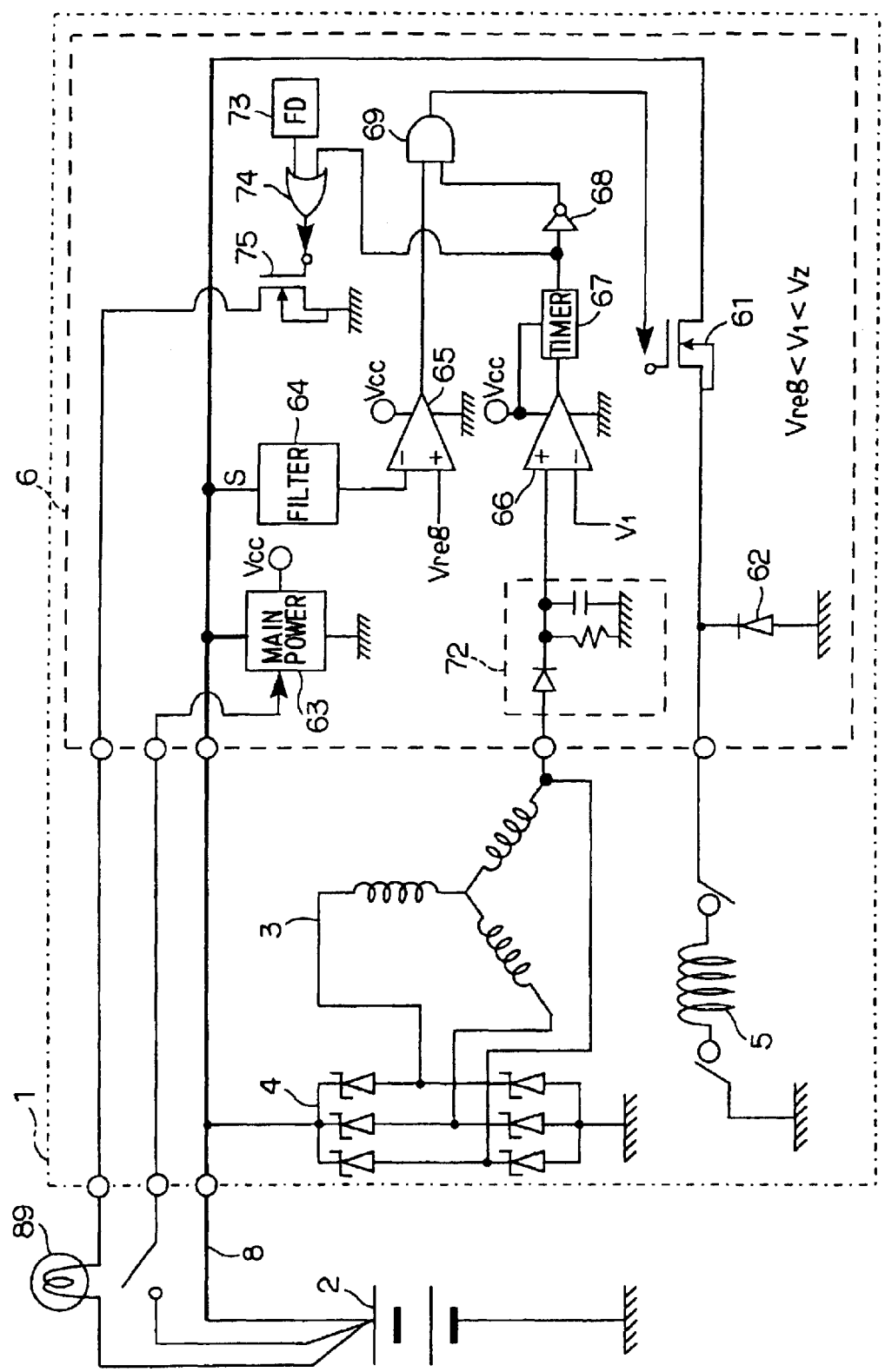
FIG. 4 is an electric wiring diagram showing a third modification of the first embodiment.

FIG. 4 shows a third modification.

In this modification, unlike the first modification, a transistor 75 for driving an alarm lamp 89 in the driver's seat is provided so that the alarm lamp driving transistor 75 is controlled with an output signal of a timer circuit 67.

An ordinary failure alarm detecting circuit 73, lights up the alarm lamp 89, by detecting the well known failure mode. An OR gate 74, obtains the logical sum of the output signal of the timer circuit 67, and the output signal of ordinary failure detecting circuit 73.

Employing this structure, when occurrence of a failure in the power supply line 8 is detected, supply of the field current stops and the transistor 75 for driving the alarm lamp 89 is turned off to light up the alarm lamp 89, in order to notify occurrence of a failure to a driver. When power generation stops due to the generation of high voltage, the driver is immediately notified. Therefore, generation of a failure can be detected quickly and adequate measures can be taken before a failure extends to wider area.

If the power generation stop period is extended, battery voltage is gradually lowered and a low voltage alarm, which is one of the ordinary alarm mode is operated. Thereby, the driver can also be notified of a failure.

Fourth Modification

Figure 5:
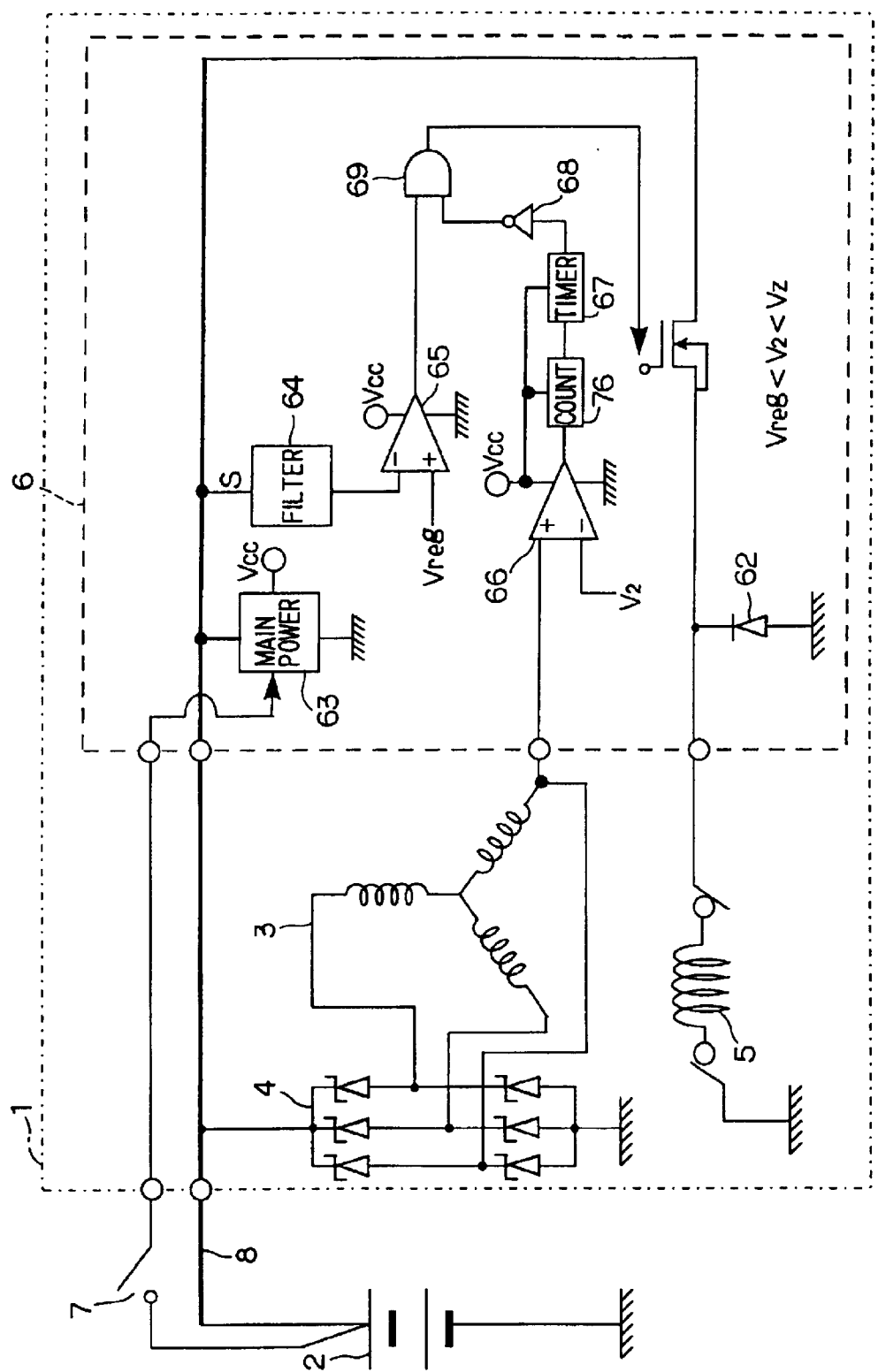
FIG. 5 is an electric wiring diagram showing a fourth modification of the first embodiment.

FIG. 5 shows a fourth modification.

In this modification, unlike the second modification, a binary pulse is generated from the output voltage of the armature winding 3 and a failure in the power supply line 8 is detected with a digital counter 76.

The second comparator 66 compares voltage of the power supply line 8 with the threshold value V2, which is larger than Vreg and smaller than the reverse breakdown voltage Vz of the Zener diode to generate a binary pulse signal. Setting is executed to generate high level voltage through the inversion when such a binary pulse is generated exceeding the predetermined number. Therefore, while the binary pulse is generated exceeding the predetermined number of pulses, the timer circuit 67 is started and power generation is stopped only for the predetermined period. With this control method, an operation go effect that is similar to that in the second modification can be attained and damage to the power supply line 8, alternator 1 and electrical systems of the vehicle can be alleviated.

Fifth Modification

Figure 6:
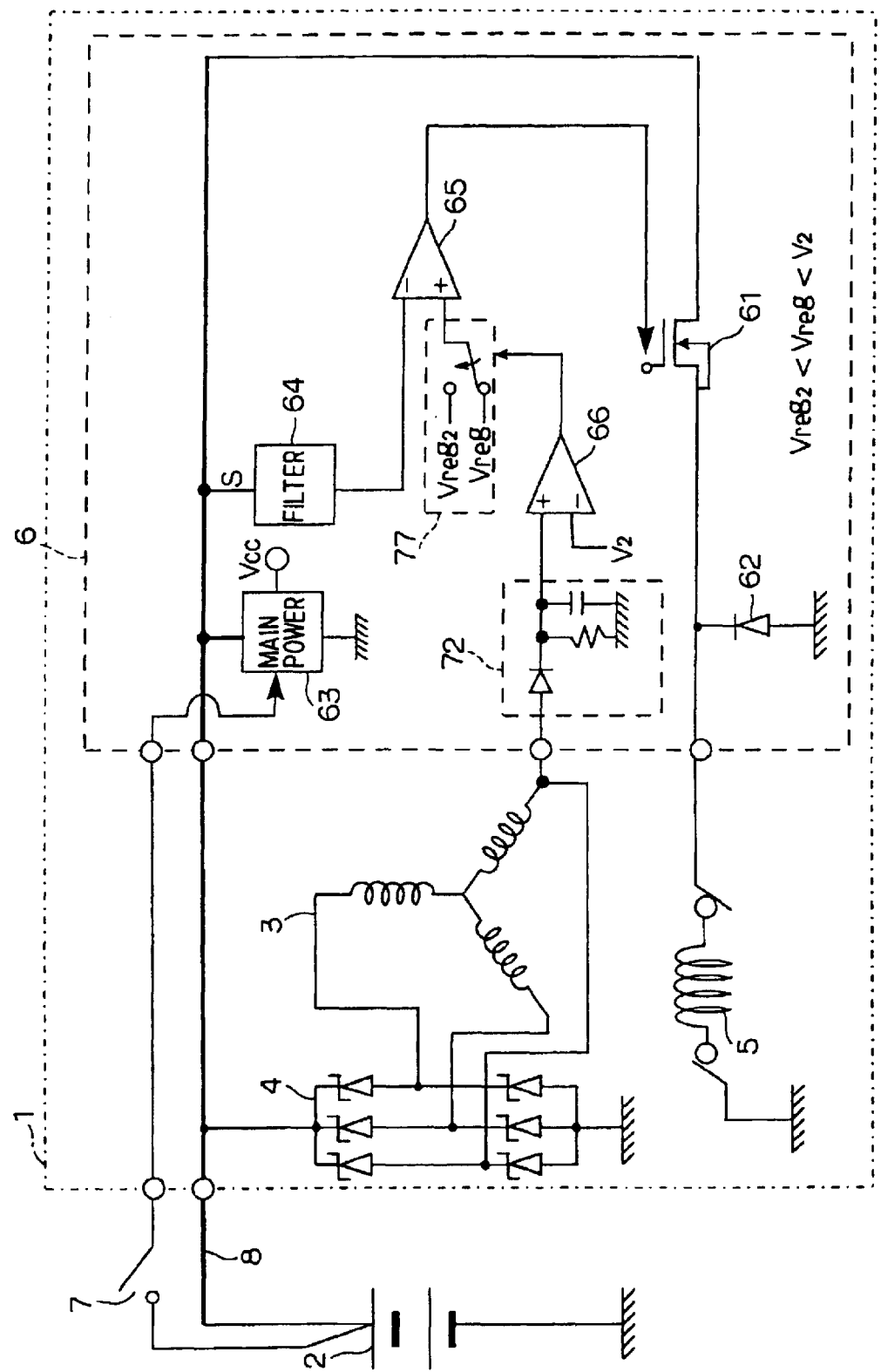
FIG. 6 is an electric wiring diagram showing a fifth modification of the first embodiment.

FIG. 6 shows a fifth modification.

In this modification, when a certain failure is detected in the power supply line 8, the reference value of the first comparator 65, namely the regulated voltage value is set as the second regulated voltage value Vreg2, that is smaller than the ordinary value Vreg. Owing to this setting, if a failure is detected, the amount of power generated can easily be reduced. The second regulated voltage value is set, for example, to the value to maintain the minimum voltage to drive the voltage regulator 6. Owing to this setting, the minimum power to realize re-generation of power after cease of operation of timer circuit can be reached and the alarm function to notify the alarm signal can also be maintained.

For example, the second regulated voltage value is preferably set to about one half of the nominal voltage of the on-board battery. In this modification, when the timer circuit is in the operative condition, that is, a failure is detected in the power supply line 8, an output current of only the field current flows into the full-wave rectifier 4, and therefore temperature rise of the rectifying diode can be kept to a very small value.

In this modification, operation is set to a sequence wherein the operation mode immediately shifts to the power generation control mode or generation stop mode upon detection of a failure in the power supply line 8. It is also possible to introduce a sequence, wherein the failure detecting circuit shifts to the power generation control mode or stop mode when the period, wherein the peak value of the rectifier output or armature winding output exceeds the predetermined value, continues for the constant time or longer.

Second Embodiment

Figure 8:
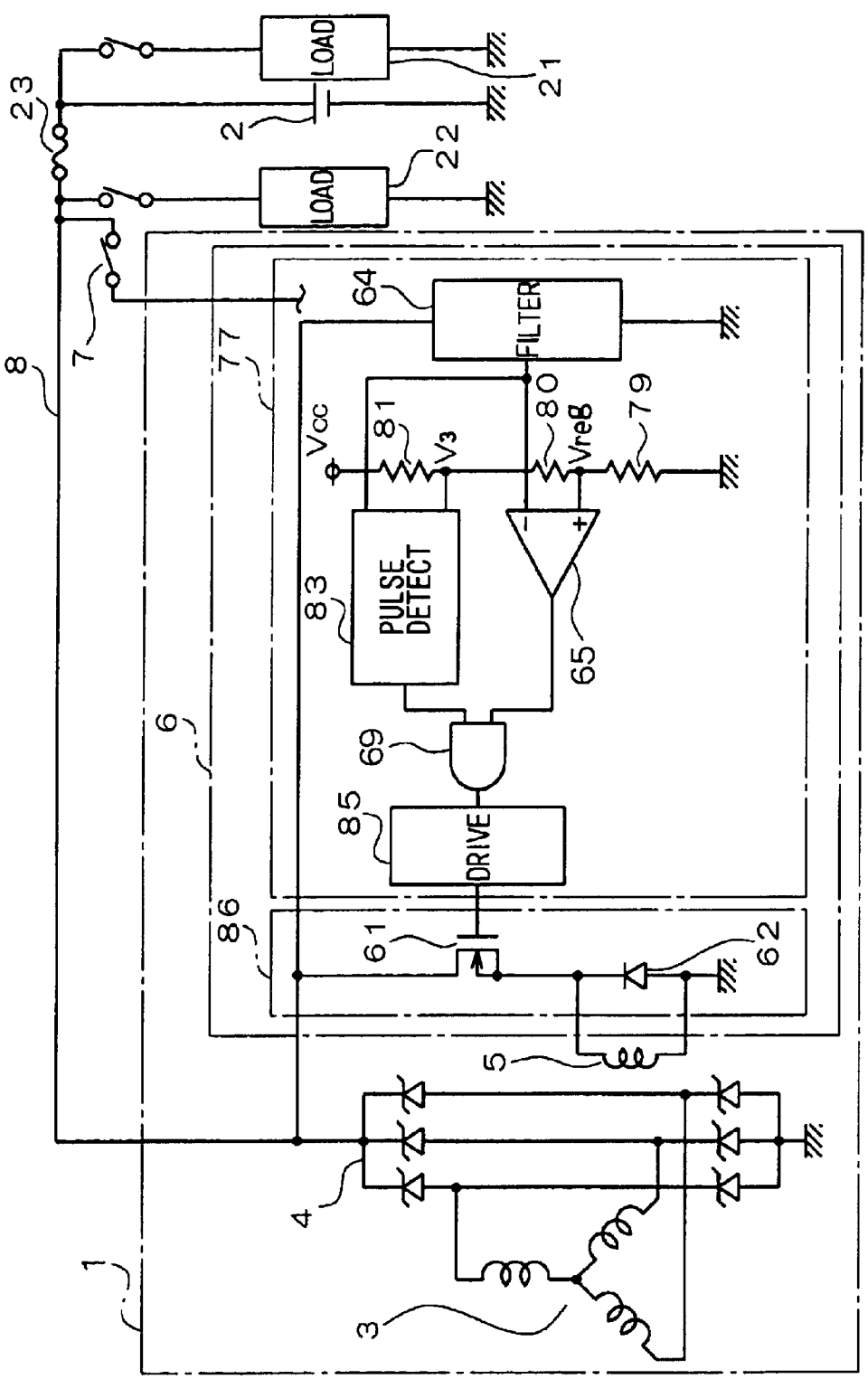
FIG. 8 is an electric wiring diagram showing an alternator for a vehicle according to a second embodiment of the present invention.

FIG. 8 shows an alternator 1 for a vehicle according to a second embodiment.

The alternator 1 for a vehicle comprises an armature winding 3, a full-wave rectifier 4, a field winding 5 and a voltage regulator 6. The full-wave rectifier 4 is formed of power Zener diodes for rectifying the AC voltage of the armature winding 3 to DC voltage to have the reverse breakdown characteristics in order to restrict generation of high voltage pulse when a load is cut off. The output of the full-wave rectifier 4 is connected to each electric load 21 of a battery 2 and a vehicle.

The output of the alternator 1 changes depending on the number of rotations of engine and power feeding to the field winding 5. The field current flowing into the field winding 5 is controlled with the voltage regulator 6.

When a key switch 7 connected to the battery 2 is turned on, supply of the reference voltage Vcc of the voltage regulator 6, and bias voltage required for operation of each circuit may be started.

The voltage regulator 6 is formed with an output voltage control circuit 77, and a field current control circuit 86. The output voltage control circuit 77 comprises a high frequency noise filter circuit 64, resistors 79, 80, 81, voltage comparator 65, a high voltage pulse detecting circuit 83, an AND gate 69, and a transistor drive circuit 85.

The high frequency noise filter circuit 64 eliminates unwanted high frequency noise element to protect the voltage control operation from the ripple superimposed on an output voltage of the armature winding 3 and from the switching noise. A voltage signal having passed the high frequency noise filter circuit 64 is then inputted to the voltage comparator 65, and high voltage pulse detecting circuit 83.

The voltage comparator 65 compares two terminal voltages, one of which is the output voltage of the high frequency noise filter circuit 64 and the other of which is the regulated voltage Vreg divided from the reference voltage Vcc with resistors 79 to 81. When a voltage higher than the regulated voltage Vreg is applied to the negative terminal, the output of the voltage comparator 65 becomes low level. When a voltage lower than the regulated voltage Vreg is applied, on the contrary, the output of the voltage comparator 65 becomes high level.

When the high voltage pulse detecting circuit 83, to which an output voltage of the high frequency noise filter circuit 64, and the reference voltage V3 divided from the reference voltage Vcc, with the resistors 79 to 81 are applied, detects the high voltage pulse based on two kinds of input voltages, this circuit executes the predetermined signal process and thereafter provides an output of the low level signal for the predetermined period. Moreover, if a high voltage pulse is not detected, the high voltage pulse detecting circuit 83 provides an output of high level.

The AND gate 69, to which respective output signals of the voltage comparator 65 and high voltage pulse detecting circuit 83 are applied, provides an output of the high level when these input signals are in the high level and also provides an output of the low level in other cases. The transistor drive circuit 85 executes the on/off control of the power transistor 61 within the field current control circuit 86 depending on the voltage level of input signal.

The field current control circuit 86 comprises a power transistor 61 and a flywheel diode 62 to control a field current flowing into the field winding 5. The power transistor 61 turns on when an output terminal of the transistor drive circuit 85 is connected to the gate of the power transistor and the output of the transistor drive circuit 85 is in the high level. In this timing, the current flowing into the field winding 5 increases. The flywheel diode 62 is connected in parallel with the field winding 5 to flywheel the field current when the power feeding to the field winding 5 is controlled to OFF state.

Figure 9:
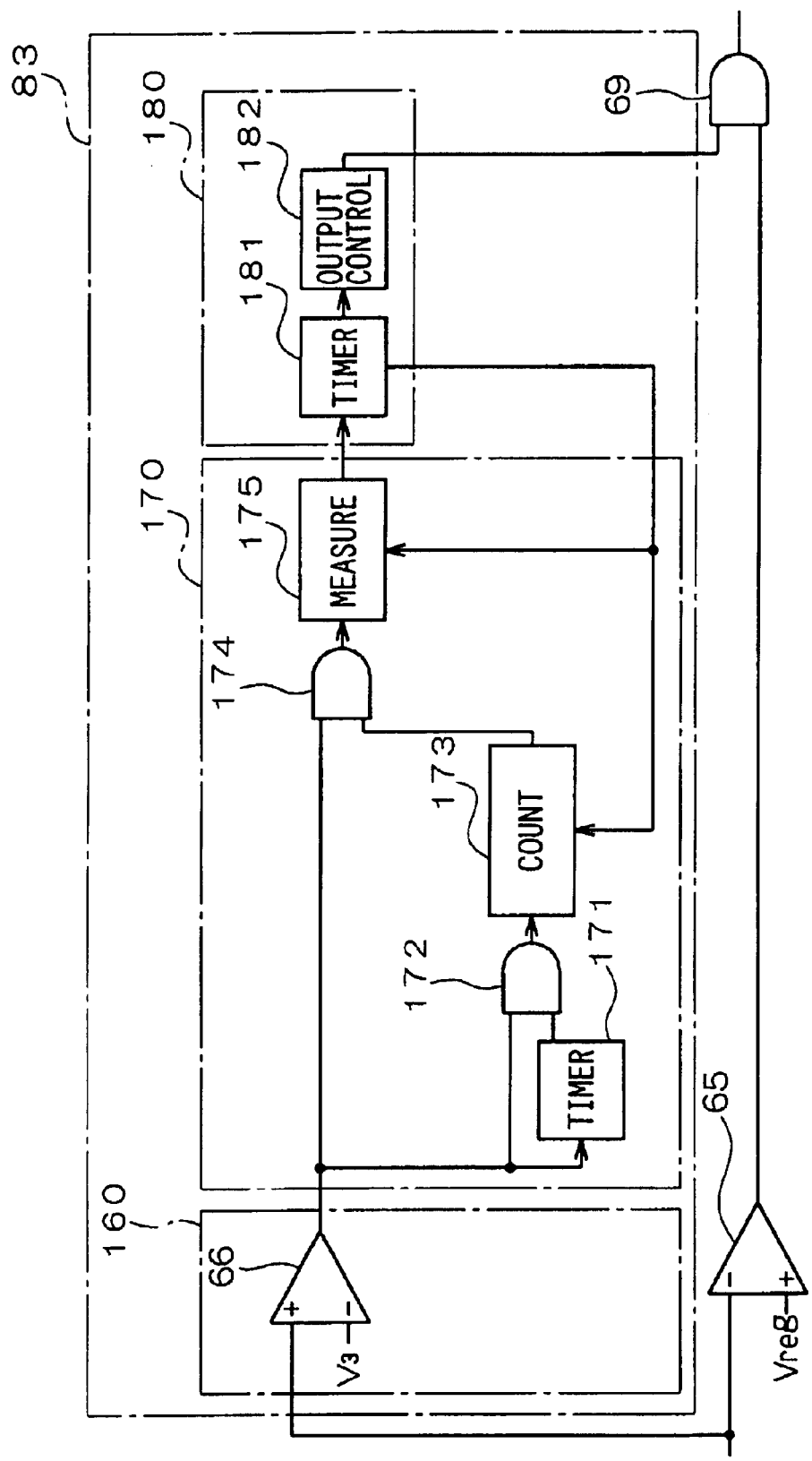
FIG. 9 is a circuit diagram showing a high voltage pulse detecting circuit in the second embodiment.

FIG. 9 shows the high voltage pulse detecting circuit 83. The high voltage pulse detecting circuit 83 comprises a high voltage pulse detecting section 160, a discriminating section 170, and an output control section 180. The high voltage pulse detecting section 160 is structured with a voltage comparator 66. The discriminating section 170 is structured with a timer circuit 171, AND gates 172, 174, a pulse counting circuit 173 and a pulse duration measuring circuit 175. The output control section 180 is structured with a timer circuit 181 and an output control circuit 182. The field current control circuit 86 corresponds to the field current control means, while the output voltage control circuit 77 to the output voltage control means, the high voltage pulse detecting section 160 to the high voltage pulse detecting means, the discriminating section 170 to the discriminating means and the output control section 180 to the output control means, respectively. The timer circuit 171, AND gate 172 and pulse counting circuit 173 correspond to the pulse counting means, while the timer circuit 171 to the timer means and the pulse duration measuring circuit 175 to the pulse duration measuring means, respectively.

When a high voltage pulse is not generated, the output of the high voltage pulse detecting circuit 83 becomes high level and is then inputted to the AND gate 69. The output voltage of the armature winding 3 having passed the high frequency noise filter circuit 64 (voltage appearing at the output terminal of the alternator 1) is applied to the negative terminal of the voltage comparator 65, in which the regulated voltage Vreg is applied to the positive terminal. When this input voltage is lower than the regulated voltage Vreg, the output becomes high level. When this input voltage is higher than the regulated voltage Vreg, the output becomes low level and is then inputted to the AND gate 69.

The high(Hi)/low(Lo) conditions of the output of the voltage comparator 65 are applied to the transistor drive circuit 85 from the AND gate 69. The power transistor 61 is turned on and off by the transistor drive circuit 85. Thereby, the output voltage of the alternator 1 is adjusted to the predetermined value Vreg (for example, 14.5V).

Next, operations when a high voltage pulse is generated will be explained.

Figure 10:
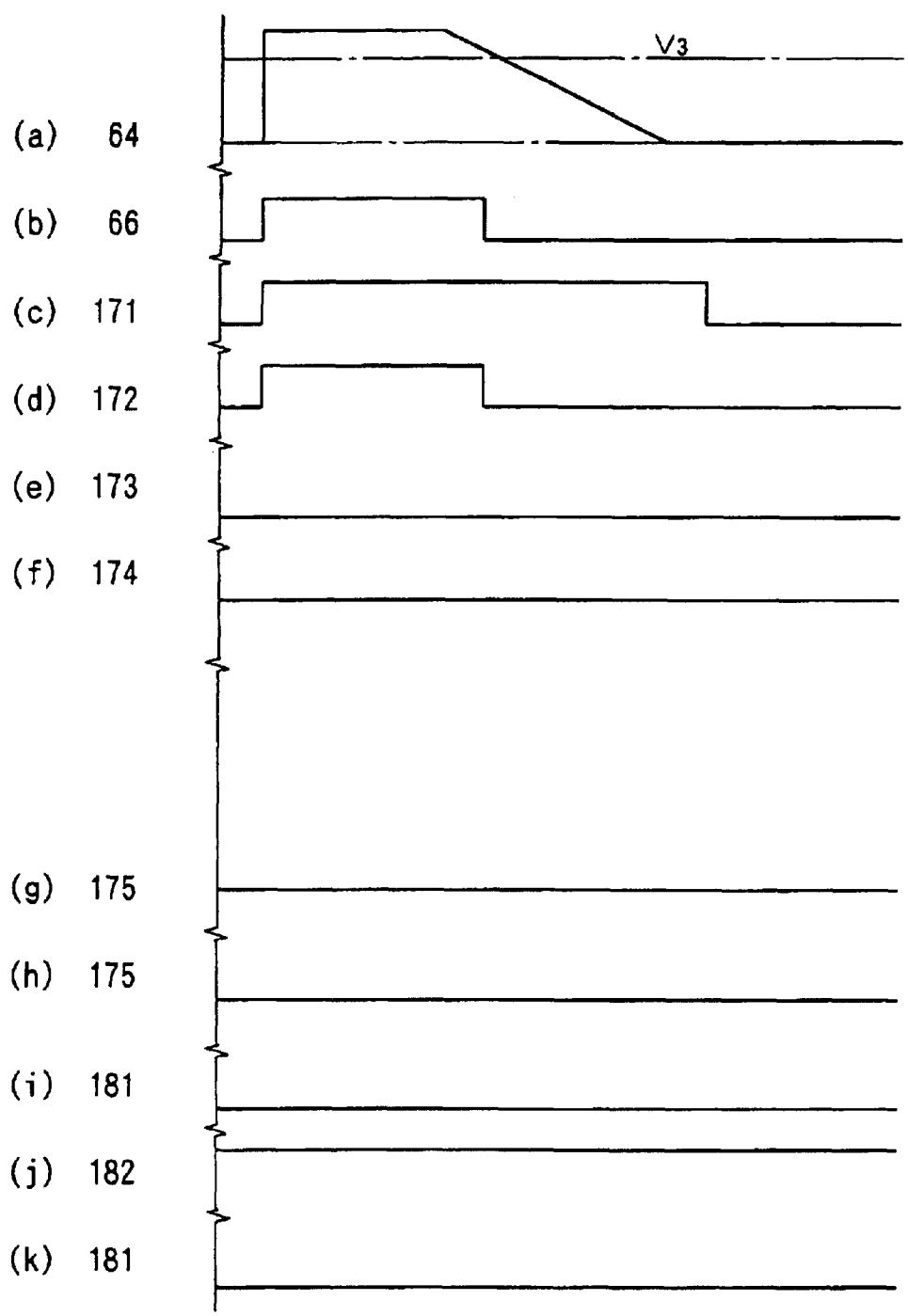
FIG. 10 is a timing diagram showing signal waveforms inputted or outputted to or from each section of a voltage control circuit in the second embodiment when a high voltage pulse is generated once.

FIG. 10 is a timing diagram illustrating the signal waveforms inputted or outputted to or from each section of the voltage regulator 6 of this embodiment in the case where one high voltage pulse is generated.

When a comparatively large electric load is cut off, one high voltage pulse is generated on the power supply line 8. Since the peak value of this high voltage pulse is higher than the regulated voltage Vreg, an output of the voltage comparator 65 becomes low level and the power transistor 61 is quickly turned off. Thereafter, when a voltage pulse that is higher than the breakdown voltage of the full-wave rectifier 4 formed of the power Zener diode is applied, the power Zener diode reaches the breakdown point to absorb the energy of the high voltage pulse. In order to detect the high voltage pulse, the reference voltage V3, that is higher than the regulated voltage Vreg and is lower than the breakdown voltage is set.

When the voltage of the power supply line 8 is higher than this reference voltage V3, the output of the voltage comparator 66 within the high voltage pulse detecting section 160 becomes high level. With a rising edge of this output signal, operation of the timer circuit 171 within the discriminating section 170 is triggered. While the timer circuit 171 is operating, the AND gate 172 outputs directly the output signal of the voltage comparator 66. The pulse counting circuit 173 is structured to maintain an output of low level for the single pulse input and provide an output of high level for two or more pulse inputs.

Therefore, when a high voltage pulse is generated once in the power supply line 8, the output of the pulse counting circuit 173 becomes low level and output of the AND gate 174 also becomes low level. In this timing, the pulse duration measuring circuit 175, timer circuit 181 and output control circuit 182 do not operate, and the output of the output control circuit 182 is maintained at high level. Thereafter, the peak value of the high voltage pulse is lowered and the output voltage of the alternator 1 is adjusted to the regulated voltage Vreg.

Figure 11:
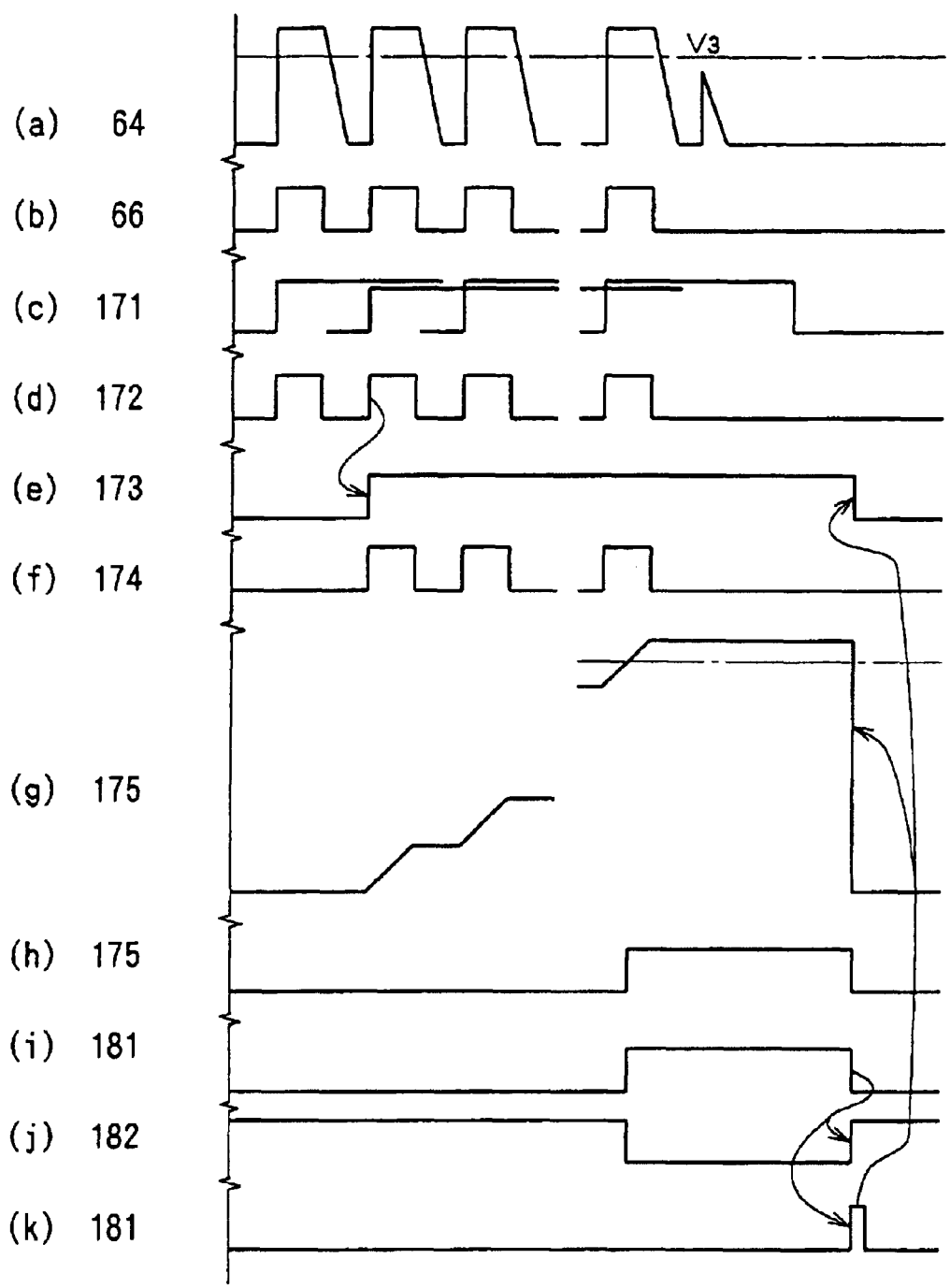
FIG. 11 is a timing diagram showing signal waveforms inputted or outputted to or from each section of the voltage control circuit in the second embodiment when the high voltage pulses are generated frequently.

Next, operation when a high voltage pulse is generated frequently will be explained below. FIG. 11 is a timing diagram illustrating signal waveforms inputted or outputted to or from each section of the voltage regulator 6 of this embodiment when a high voltage pulse is generated frequently.

If a connection failure occurs on the power supply line 8, a high voltage pulse is generated frequently on the power supply line 8. While the voltage applied to the high voltage pulse detecting circuit 83 is higher than the reference voltage V3, the output of the voltage comparator 66 is in the high level. With a rising edge of this output signal, operation of the timer circuit 171 is triggered. The timer circuit 171 operates whenever the output of the voltage comparator 66 rises and while a high voltage pulse is generated frequently, the output voltage becomes high level. Therefore, the AND gate 172 passes the output signal of the voltage comparator 66 to the pulse counting circuit 173, while the highvoltage pulse is generated frequently and the output of the timer circuit 171 is at the high level.

When the high voltage pulse is repeatedly applied, the pulse counting circuit 173 provides an output of high level at the second rising edge of output of the AND gate 172. This high level condition of output is maintained until a reset pulse (k) is inputted from the timer circuit 181 to the pulse counting circuit 173 and the pulse duration measuring circuit 175.

When the output of the pulse counting circuit 173 becomes high level, the AND gate 174 passes the output of the voltage comparator 66 to the pulse duration measuring circuit 175 of the next stage. The pulse duration measuring circuit 175 measures the input pulse duration of the output signal from the AND gate 174, and also integrates the result of measurement. The durations of the high voltage pulse generated frequently are accumulated and when the value exceeds the predetermined accumulation period, the output of the pulse duration measuring circuit 175 becomes high level.

When this high level signal is inputted, the timer circuit 181 in the output control section 180 operates. Thereby the signal inputted to the output control circuit 182 becomes high level for the predetermined period (for example, 1 sec). While the timer circuit 181 is in the operative condition, the output control circuit 182 inputs the low level signal to the AND gate 69. Thereby, the control operation is executed so that the power transistor 61 is turned off to stop the power generation.

In this embodiment, power generation is stopped when output from the output control circuit 182 is in the low level. However, it is also possible to realize duty-control for the on/off conditions of the power transistor 61 by presetting output of the output control circuit 182 to alternately repeat the low level and high level conditions in the predetermined duty ratio.

Moreover, control of power generation is also allowed through setting the power transistor 61 to on/off conditions to set a phase voltage of a certain phase of the armature winding 3 lower than the open voltage of the battery 2.

When the timer 181 terminates the operation, the reset pulse is sent to the pulse duration measuring circuit 175 and pulse counting circuit 173. Thereby the data of the accumulated period and the pulse counting value are reset.

Figure 12:
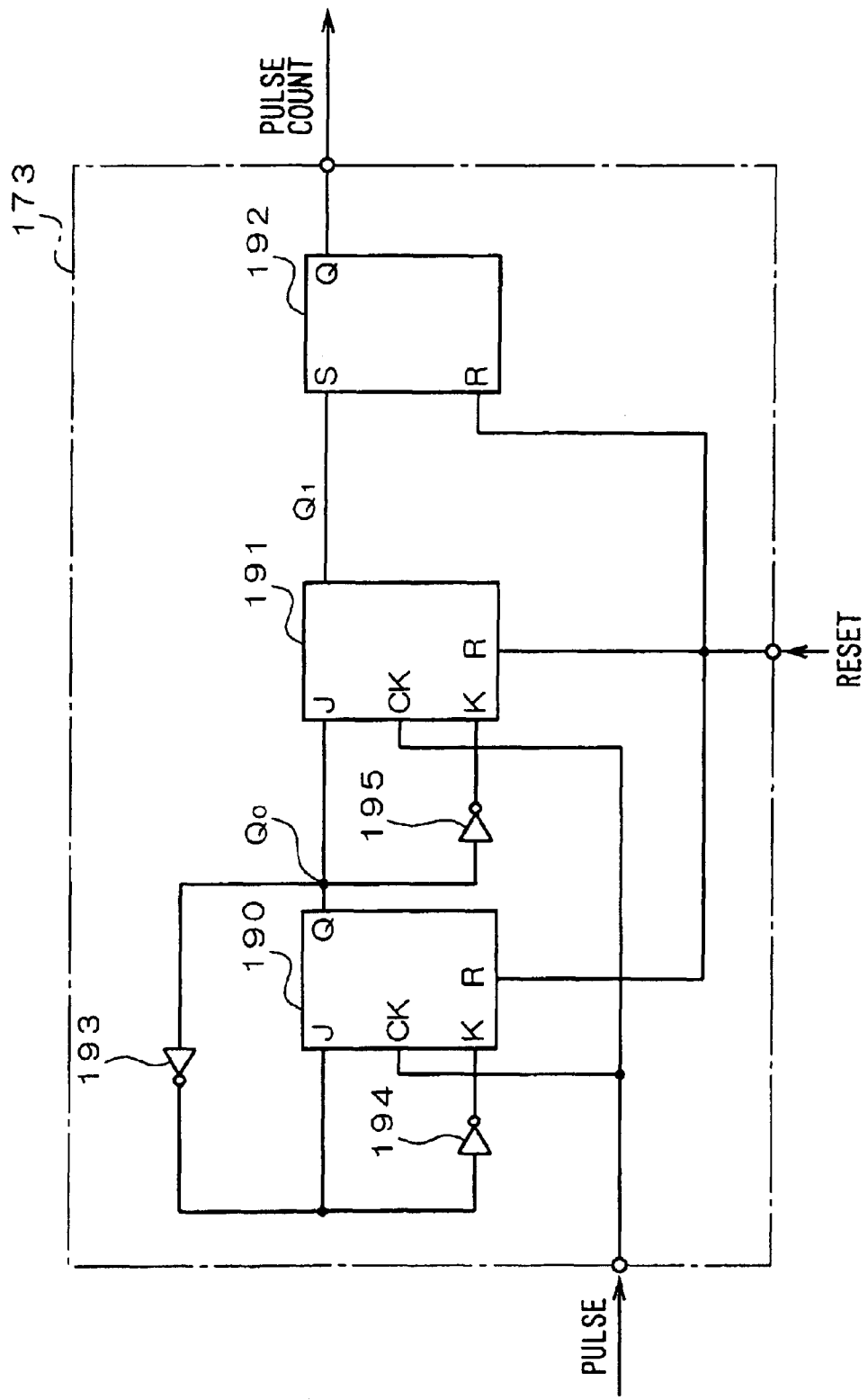
FIG. 12 is a circuit diagram showing a pulse counting circuit in the second embodiment.

FIG. 12 shows the pulse counting circuit 173. As shown in FIG. 12, the pulse counting circuit 173 is structured with a JK flip-flop circuits 190, 191, a RS flip-flop circuit 192, and inverters 193, 194, 195.

Figure 13:
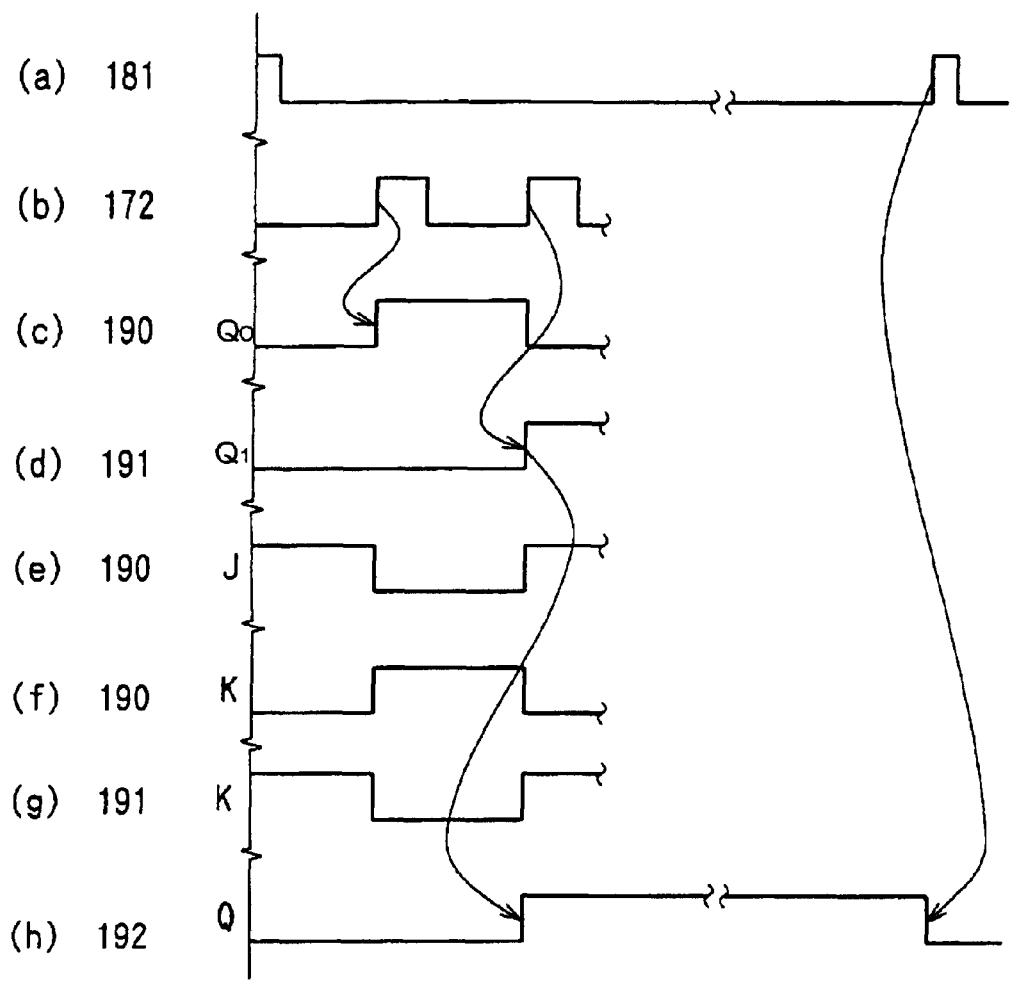
FIG. 13 is a timing diagram showing signal waveforms inputted or outputted to or from each section of the pulse counting circuit in the second embodiment.

FIG. 13 is a timing diagram illustrating the signal waveforms inputted or outputted to or from each section of the pulse counting circuit 173.

Under the condition that the high level signal is inputted to the reset terminals R of the JK flip-flop circuits 190, 191 and RS flip-flop circuit 192. These flip-flop circuits are reset, and the output Q0 of the JK flip-flop circuit 190 and the output Q1 of the JK flip-flop circuit 191 become low level. Thereby, the output of the inverter 193 becomes high level and this high level signal is applied to the input terminal J of the JK flip-flop circuit 190 of the first stage, while the low level signal is applied to the input terminal K, respectively. Thereafter, when the reset condition is cancelled, the output Q0 of the JK flip-flop circuit 190 becomes high level in synchronization with the rising edge of the pulse signal to be inputted to the clock terminal CK.

In this case, the output Q1 of the JK flip-flop circuit 191 of the second stage is in the low level. Moreover, the output of the inverter 193 changes to the low level, because the output Q0 of the JK flip-flop circuit 191 has become high level. Accordingly, the low level signal is inputted to the input terminal J of the JK flip-flop circuit 190 of the first stage, and the high level signal to the input terminal K, respectively.

The output Q1 of the JK flip-flop circuit 191 of the second stage becomes high level in synchronization with the rising edge of the next pulse signal, and thereby the output Q0 of the JK flip-flop circuit 190 of the first stage becomes low level.

When the output Q1 of the high level of the JK flip-flop circuit 191 is inputted to the input terminal S of the RS flip-flop circuit 192, the output Q of the RS flip-flop circuit 192 becomes high level. This high level condition is maintained until the reset pulse is inputted to the reset terminal R.

As explained above, the first input pulse signal of the pulse counting circuit 173 is made invalid and the second and subsequent pulse signals are made valid to change the output to the high level.

The voltage regulator 6 of this embodiment detects conditions of a high voltage pulse appearing at the output terminal of the alternator 1 connected to the power supply line 8, and discriminates the condition of a single high voltage pulse generated particularly when a failure is not a connection failure of the power supply line 8 and an electric load of comparatively large capacitance is no longer used and the condition of a high voltage pulse that is irregularly and repeatedly generated in the short period when a connection failure occurs because the power supply line 8 is not completely disconnected. Therefore, even if a comparatively large electric load is cut off, the power generation control of the alternator 1 is not erroneously responded and an unwanted drop of the output voltage can be prevented.

Moreover, when a connection failure occurs in the power supply line 8, the output of the alternator 1 is controlled, and generation of high voltage pulse applied to the power Zener diode forming the full-wave rectifier 4 is controlled. The temperature rise of the power Zener diode can also be controlled effectively and thereby thermal breakdown can be prevented.

The reverse withstand voltage of the power Zener diode can be thermally designed to have sufficient strength even for the condition to instantaneously generate a no-load saturation voltage of the alternator 1, by cutting off the rated load in the maximum allowable number of rotations of the alternator 1, namely by electrically cutting off the battery 2 and electric load 21, during power generation.

Even in the condition where the output terminal is completely disconnected, for example, the power supply line 8 and a fusible link 23 inserted in series to the power supply line 8 are disconnected (this condition is called the "perfect B disconnection"), the power transistor 61 for controlling a field current is quickly turned off. Thereby, an energizing circuit such as the field winding 5 or the like can be protected. Moreover, the alternator 1 can be protected from breakdown so that a high voltage pulse generated in the generator output can be absorbed by the power Zener diode.

In the condition that an electric load 22 connected directly to the power supply line 8 without via the fusible link 23 exists, perfect B disconnection occurs. Therefore, even if a comparatively high voltage pulse is generated once, the output control of the alternator 1 is not executed. Accordingly, the power can be supplied to the electric load 22 connected directly to the power supply line 8 without any drop of the output voltage.

Further, an adequate measure can be taken even when the full-wave rectifier 4 is usually formed using the power Zener diode of a lower withstand voltage by discriminating the high voltage pulse generated with cutting off condition of the load from the high voltage pulse generated when a failure occurs. Thereby, an unwanted drop of the output voltage for ordinary cut-off of load when the high voltage detection level is lowered can be prevented to cover reduction of the withstand voltage of the power Zener diode. Such reduction of the withstand voltage realizes a reduction in the cost of the charging system of the vehicle because the noise appearing on the power supply line 8 can be absorbed, radiated noise can be reduced and the withstand voltage of the alternator 1 can also be lowered.

High voltage pulses generated in an irregular manner with the short period can be detected accurately and temperature rise of power Zener diode can effectively be controlled quickly to prevent thermal breakdown by comparing, when a connection failure in which the power supply line 8 is perfectly disconnected, the accumulated period of the high voltage pulses generated frequently with the allowable application period of the power Zener diode.

In addition, in view of eliminating influence on the voltage control operation of ripples and switching noises, the voltage signal having passed the high frequency noise filter circuit 64 is inputted to the high voltage pulse detecting circuit 83 as another control system different from the regulated voltage control system. Thereby, since the allowable period of the high voltage pulse is discriminated depending on the accumulated period of the high voltage pulse, any delay is generated in the process of the regulated voltage control system. Therefore, when the high voltage pulse is generated, the power transistor 61 can be turned off quickly and any adverse effect is not caused in the regulated voltage control operation.

Moreover, if the high voltage pulses are generated repeatedly and the accumulated period thereof exceeds the allowable application period of the power Zener diode, the output of the alternator 1 is controlled and thereby generation of a high voltage pulse can also be controlled. Upon completion of the output control of the alternator 1, a reset pulse is generated and the data such as accumulated period of the high voltage pulse and the count number of the pulse counting circuit 173 are reset. Accordingly, if the high voltage pulses are generated repeatedly, detection of the high voltage pulse and control of the power generating operation are repeatedly conducted and progress of damage at the connection failure region of the power supply line 8 can be delayed. Furthermore, since changes for generation of high voltage pulse can be reduced, electric damage on the electric loads 21, 22 can also be controlled.

Third Embodiment

Figure 14:
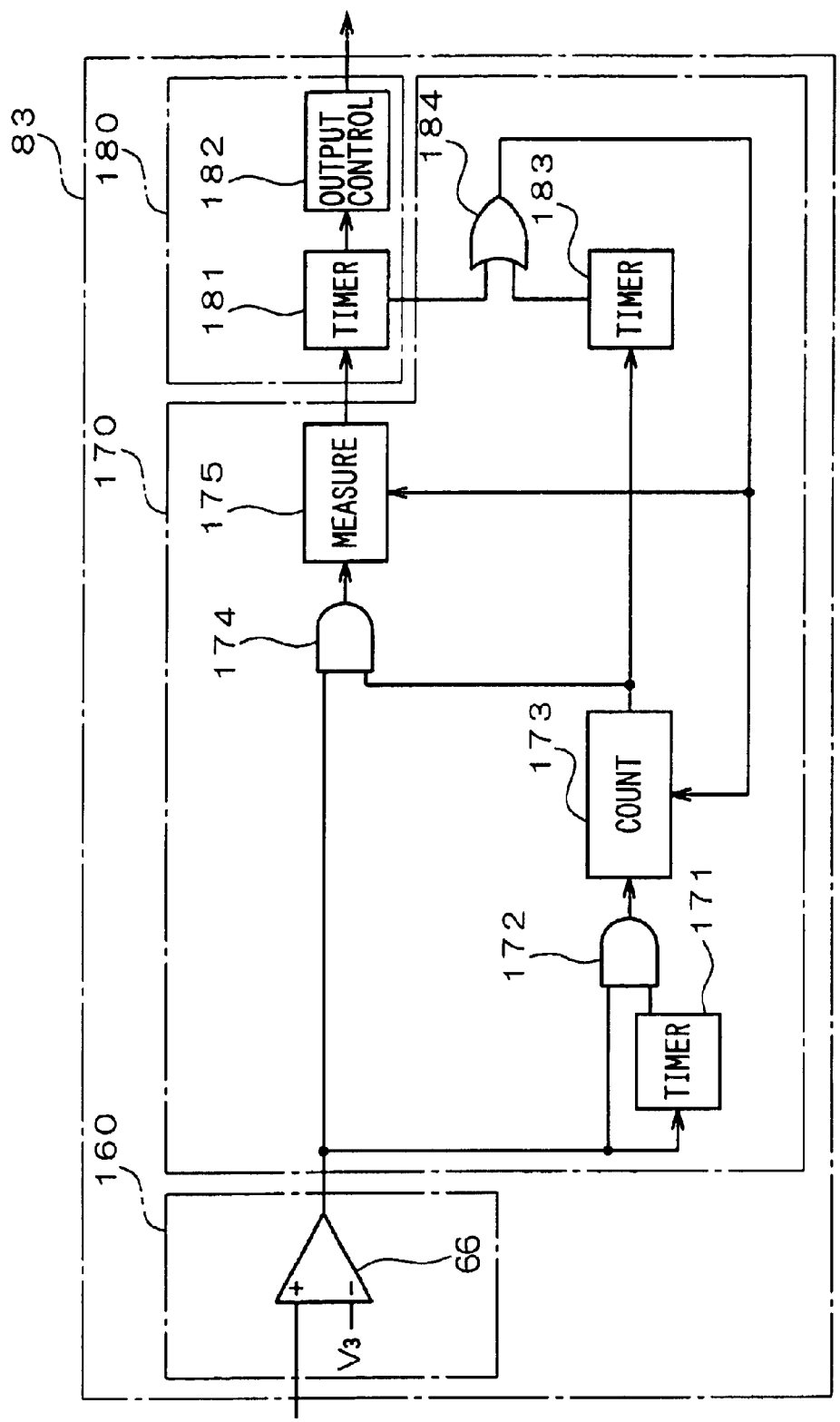
FIG. 14 is a circuit diagram showing a high voltage pulse detecting circuit included in a voltage regulator of an alternator for a vehicle according to a third embodiment of the present invention.

FIG. 14 shows a high voltage pulse detecting circuit 83 included in the voltage regulator 6 of the alternator 1 according to a third embodiment.

The high voltage pulse detecting circuit 83 comprises a high voltage pulse detecting section 160, a discriminating section 170 and an output control section 180. This high voltage pulse detecting circuit 83 is different from the high voltage pulse detecting circuit 83 of the second embodiment shown in FIG. 9.

The discriminating section 170 is provided with a timer 171, AND gates 172, 174, a pulse counting circuit 173 and a pulse duration measuring circuit 175. It further comprises a timer circuit 183 and an OR gate 184. The additional timer circuit 183 receives the input of the output signal of the pulse counting circuit 173, while the OR gate 184 receives input of each output signal of two timer circuits 181, 183. The output signal of the OR gate 183 is inputted as a reset pulse to the pulse duration measuring circuit 175 and pulse counting circuit 173. The pulse counting circuit 173 and pulse duration measuring circuit 175 correspond to the memory means, while the timer circuit 183, and the OR gate 184 correspond to the reset signal generating means, respectively.

Figure 15:
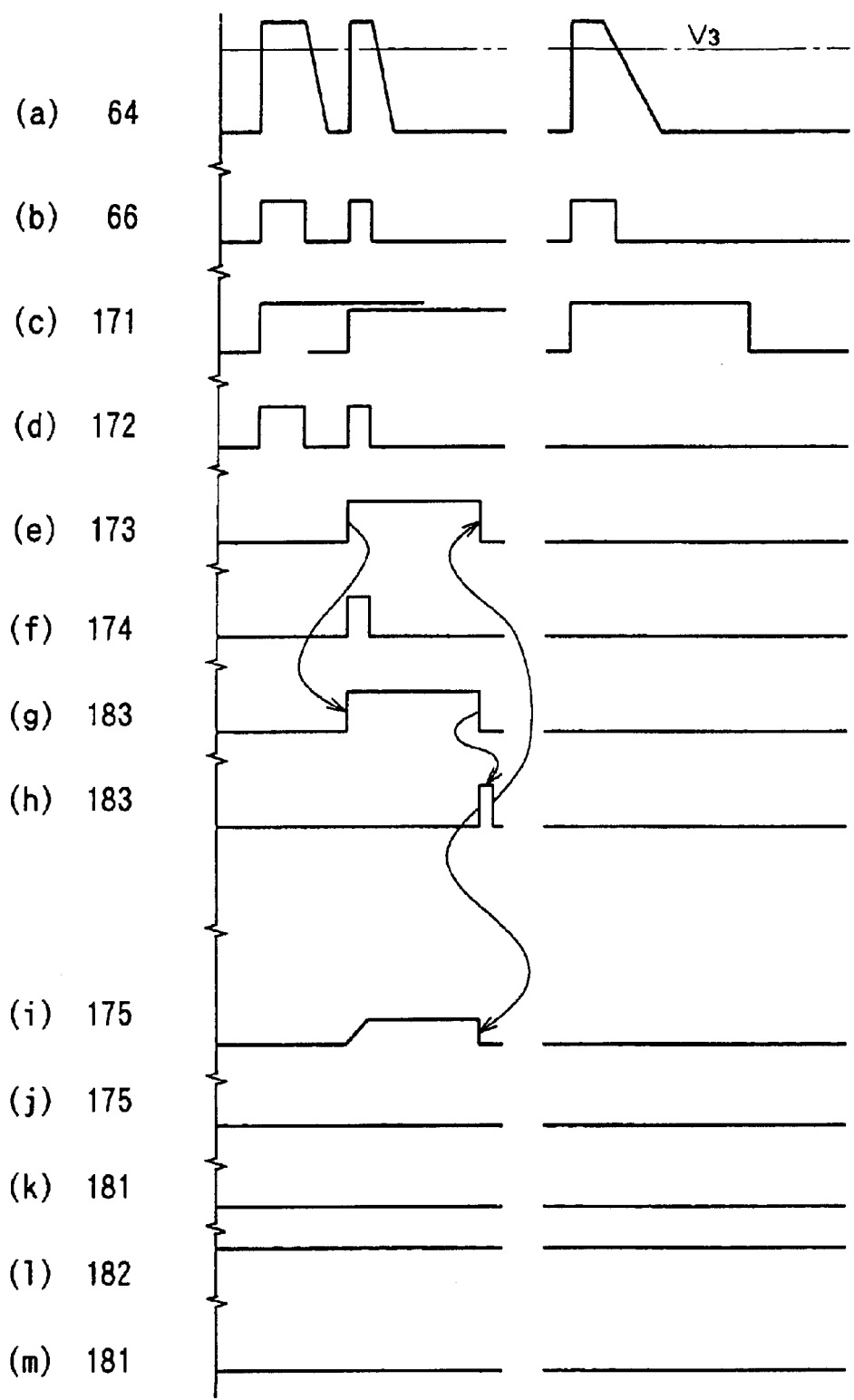
FIG. 15 is a timing diagram showing signal waveforms inputted or outputted to or from each section of the high voltage pulse detecting circuit in the third embodiment.
Figure 16:
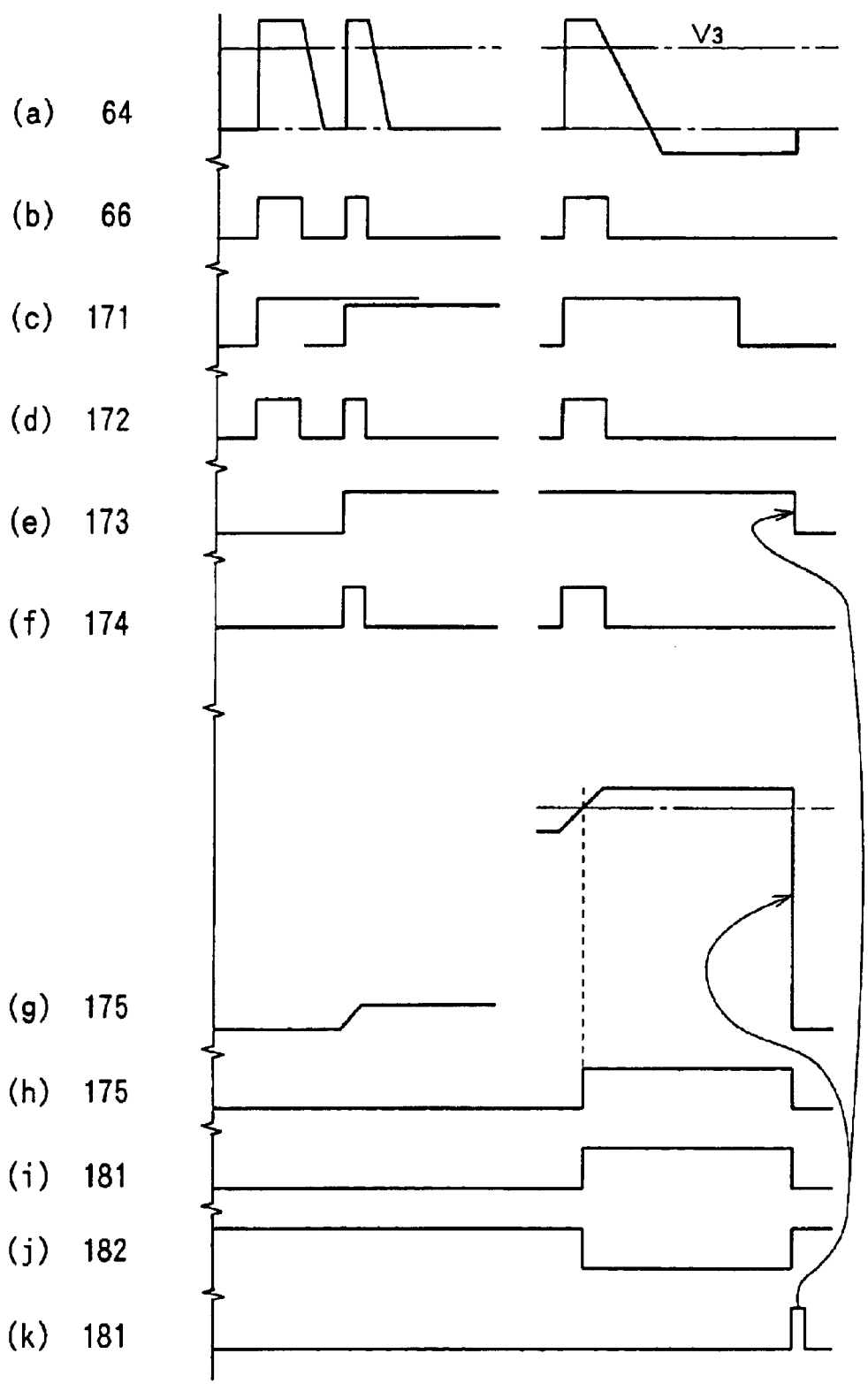
FIG. 16 is a timing diagram showing comparison of signal waveforms inputted or outputted to or from each section of the high voltage pulse detecting circuit of FIG. 9.

FIG. 15 shows signal waveforms inputted or outputted to or from each section of the high voltage pulse detecting circuit 83 of this embodiment. FIG. 16 is a diagram for comparing the signal waveforms to be inputted or outputted to or from each section of the high voltage pulse detecting circuit 83 shown in FIG. 9.

When connection of an inductive load (for example, a motor to rotate an electric fan, or the like) is cut off with a relay or a switch or the like, chattering occurs depending on the response characteristic of the relay or the like. Even when the cut-off operation is performed once, it is probable that the high voltage pulses are generated several times.

In the high voltage pulse detecting circuit 83 shown in FIG. 9, if a high voltage pulse higher than the reference voltage V3 is generated several times as shown in FIG. 16, the voltage comparator 66 outputs the high level signal several times corresponding to such high voltage pulses. In synchronization with the rising edge of this signal, the timer circuit 171 starts the operation. The AND gate 172 passes the output signal of the voltage comparator 66, while the timer circuit 171 is in the operative condition. The pulse counting circuit 173 outputs the high level signal when the pulses are inputted two times or more and the AND gate 174 outputs the high level signal only for the pulse duration. The pulse duration measuring circuit 175 measures the pulse duration and holds the pulse. Thereafter, since the pulse counting circuit 173 maintains the high level output, the pulse duration is accumulated in the pulse duration measuring circuit 175 for each generation, whenever the high voltage pulse is generated due to the cut-off condition of load. When the accumulated duration exceeds the predetermined accumulated period, the pulse duration measuring circuit 175 outputs the high level signal. With this high level signal, the timer circuit 181 operates, followed by operation of the output control circuit 182, to control the power generation output. Accordingly, the output voltage of the alternator 1 is lowered. Upon completion of operation of the timer circuit 181, the reset pulse is inputted to the pulse duration measuring circuit 175 and pulse counting circuit 173 to reset the data of accumulated period and pulse count number.

Next, operation to avoid such unnecessary power generation control will be explained with reference to FIG. 15.

In the high voltage pulse detecting circuit 83 shown in FIG. 14, the timer circuit 183 starts operation when an output of the pulse counting circuit 173 rises to the high level. This timer circuit 183 generates the reset pulse after the predetermined time has passed and the accumulated period data and pulse count number are reset earlier than output of the reset pulse from the timer circuit 181. Thereafter, a single high voltage pulse generated in a certain case because the cut-off condition of load is not accumulated and the output control circuit 182 does not operate.

Even in the case where there is no particular contact failure of the power supply line 8, if a high voltage pulse is generated due to the chattering phenomenon when the load is cut off depending on the response characteristic of a relay or the like to control the on/off conditions of the electric load 21, the output condition and accumulated period data of the pulse counting circuit 173 are reset after the predetermined time has passed. Thereby, malfunction of power generation control can be prevented.

The high voltage pulse generated in this case is absorbed by the power Zener diode forming the full-wave rectifier 4. As explained above, the reverse withstand voltage of power Zener diode is thermally designed particularly to be resistive to the condition for instantaneously generating a non-load saturation voltage of the alternator 1 with cut-off of the rated load under the maximum allowable number of rotations of the alternator 1 and therefore such high voltage pulse can be absorbed with sufficient allowance.

In addition, since the timer circuit 183 for resetting the data of the accumulated period can set the time independently, the connection failure of the power supply line 8 and chattering phenomenon when the load is cut off can be discriminated easily.

Fourth Embodiment

Figure 17:
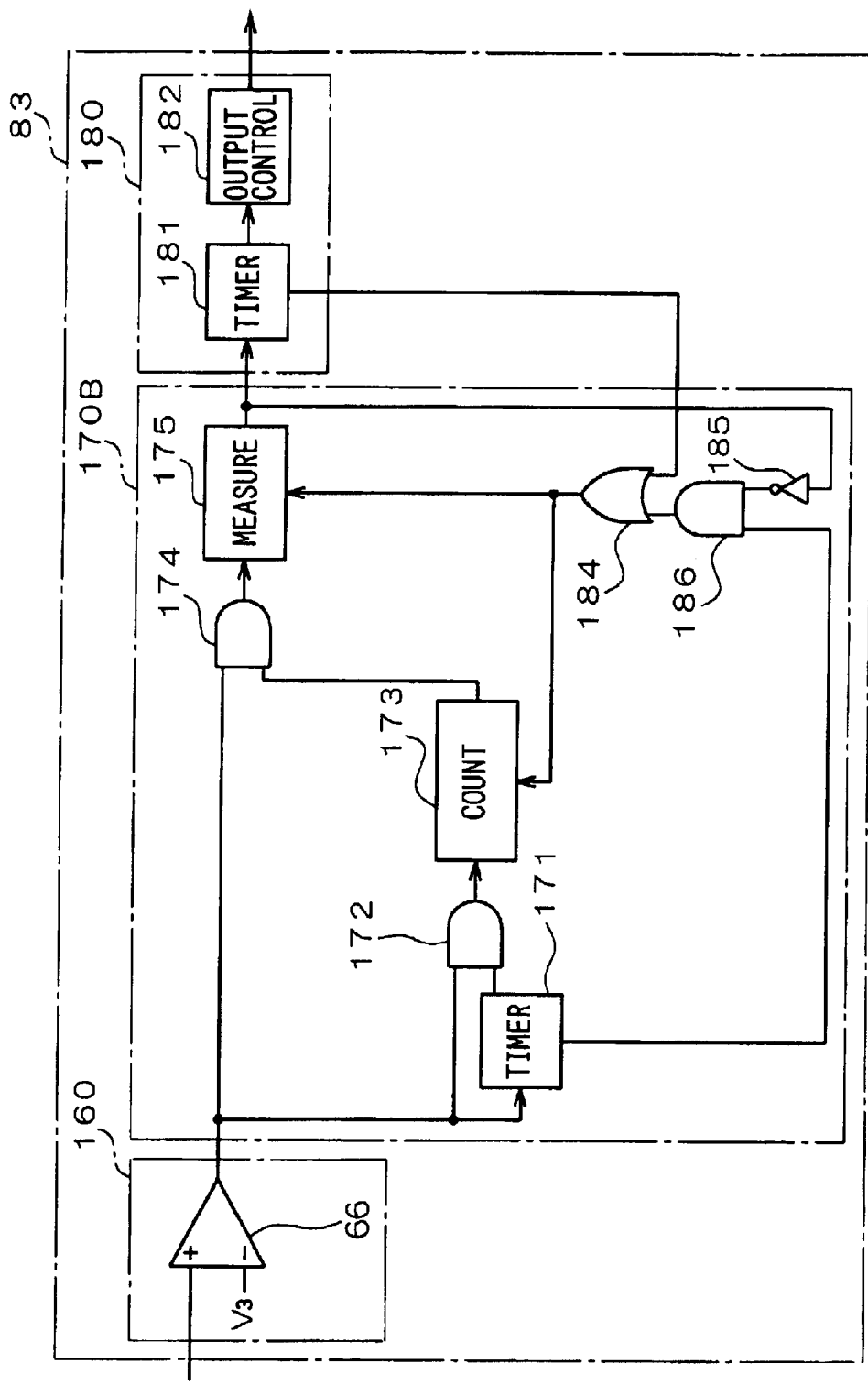
FIG. 17 is a circuit diagram showing a high voltage pulse detecting circuit included in a voltage regulator of an alternator for a vehicle according to a fourth embodiment of the present invention.

FIG. 17 shows a high voltage pulse detecting circuit 83 of the alternator 1 according to a fourth embodiment. This circuit 83 is structured with a high voltage pulse detecting section 160, discriminating section 170 and output control section 180.

The discriminating section 170 is similar to that of the third embodiment, but it further comprises an OR gate 184, an inverter 185 and an AND gate 186. The discriminating section 170 generates a reset pulse signal with the timer circuit 171 to input this signal to the one input terminal of the AND gate 186 and also inputs the signal inverted with the inverter 185 from the output signal of the pulse duration measuring circuit 175 to the other input terminal of the AND gate 186. The output signal of the AND gate 186 is inputted to the OR gate 184.

Figure 18:
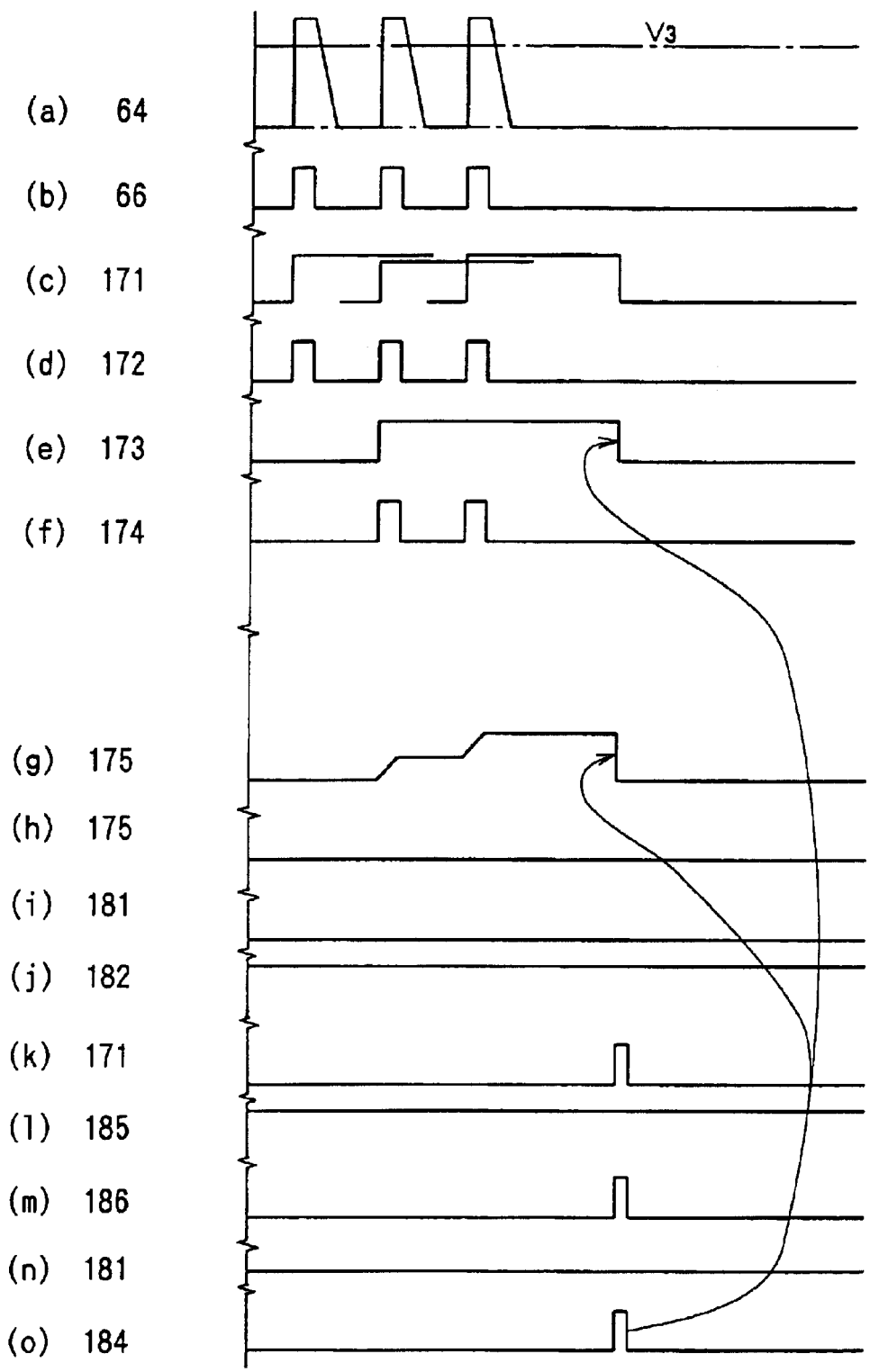
FIG. 18 is a timing diagram showing signal waveforms inputted to each section of the high voltage pulse detecting circuit in the fourth embodiment.

FIG. 18 shows signal waveforms to be inputted to each section of the high voltage pulse detecting circuit 83 shown in FIG. 17, wherein the high voltage pulses are generated several times.

When a high voltage pulse higher than the reference voltage V3 is generated several times, the output of the voltage comparator 66 becomes high level corresponding thereto. With the rising edge of this output signal, the timer circuit 171 is triggered to operate. The AND gate 172 passes, during operation of the timer circuit 171, the output signal of the voltage comparator 66 to the pulse counting circuit 173 of the next stage. Here, the pulse counting circuit 173 outputs the signal of high level for the input of the second and subsequent pulses. Therefore, the output of the AND gate 174 becomes high level only for the pulse duration. The pulse duration is measured and accumulated with the pulse duration measuring circuit 175. When generation of high voltage pulse stops, operation of the timer circuit 171 also stops and the reset pulse of the timer circuit 171 is generated (FIG. 18(*k*)).

The output of the pulse duration measuring circuit 175 maintains the low level because the accumulated period of pulse does not reach the predetermined value (for example, 50 ms). The signal of the high level that is generated by inverting such a signal with the inverter 185 is then inputted to the AND gate 186. In this case, as the output of the AND gate 186, the reset pulse of the timer circuit 171 is outputted directly. Since the timer circuit 181 is not operative, the reset pulse outputted from the timer circuit 181 maintains the low level. Therefore, the OR gate 184 passes directly output of the AND gate 186 to the circuit of the next stage. Thereby, the reset pulse outputted from the timer circuit 171 is sent to the pulse duration measuring circuit 175 and the pulse counting circuit 173 to reset the accumulated period data and pulse count number.

Figure 19:
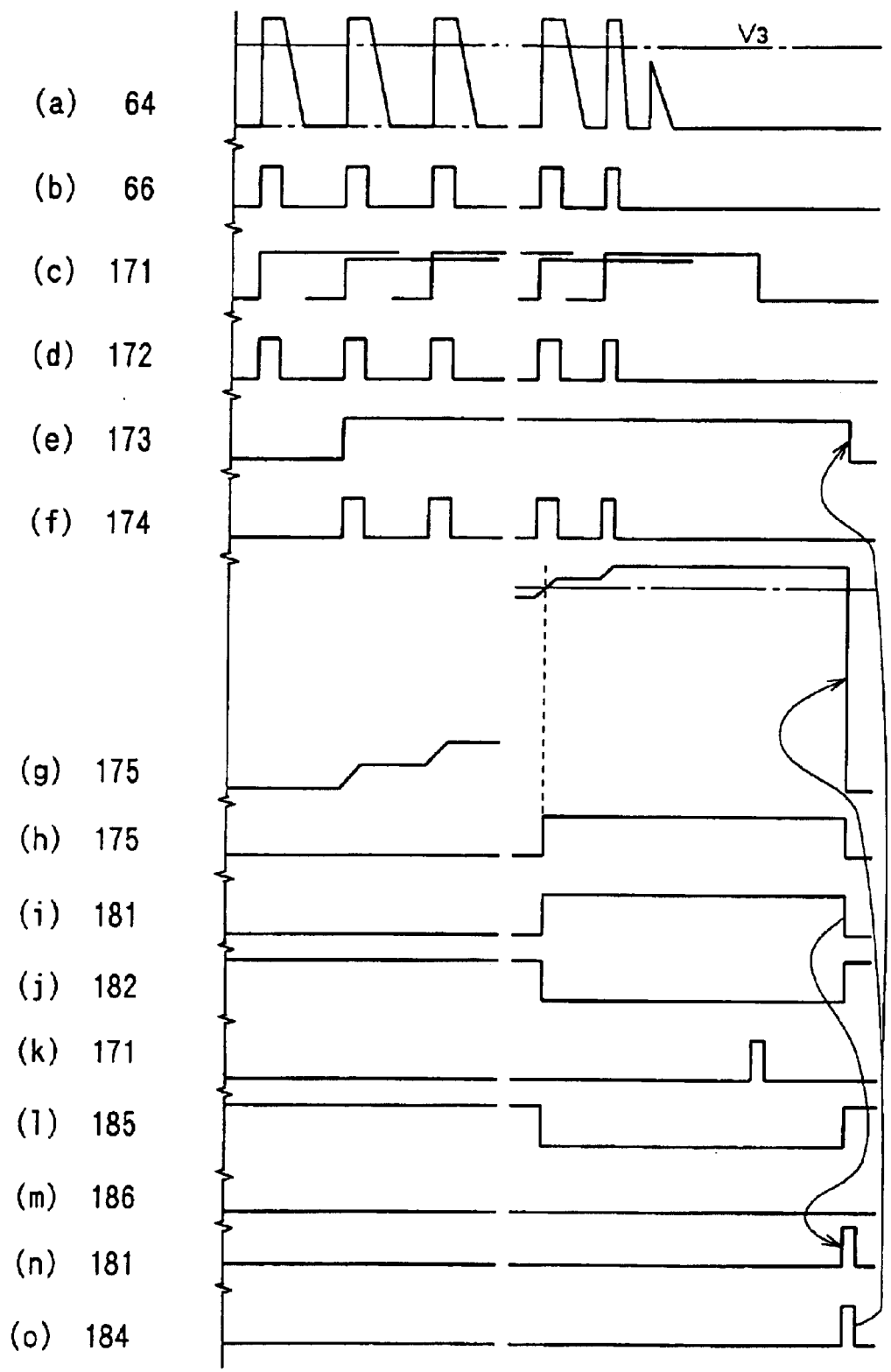
FIG. 19 is a timing diagram showing signal waveforms inputted to each section of the high voltage pulse detecting circuit in the fourth embodiment.

FIG. 19 shows signal waveforms inputted to each section of the high voltage pulse detecting circuit 83 shown in FIG. 17. In this case, the high voltage pulses are generated continuously.

When high voltage pulses are applied, the pulse durations are measured and accumulated with the pulse duration measuring circuit 175 (FIG. 19(*g*)). When the high voltage pulses are applied continuously, since the timer circuit 171 does not operate during this period, the reset pulse is not generated with the timer circuit 171. Thereafter, when the pulse duration exceeds the predetermined accumulated period (for example, 50 msec), the output of the pulse duration measuring circuit 175 becomes high level and thereby the timer circuit 181 operates. The output control circuit 182 controls power generation while the timer circuit 181 operates (for example, 1 sec).

Upon completion of the timer circuit 181, the timer reset pulse 181 outputs the reset pulse (FIG. 19(*n*)). When power generation is controlled corresponding to operation of the timer circuit 181 and thereby the high voltage pulse is no longer applied, the timer circuit 171 stops operation and the reset pulse is outputted from the timer circuit 171 (FIG. 19(*k*)). As explained above, the reset pulse is outputted from the timer circuit 171, but since a signal obtained by inverting the output signal of the pulse duration measuring circuit 175 with the inverter 185 is inputted to the AND gate 186, the output of the AND gate 186 is maintained at the low level.

Therefore, the OR gate 184 passes the reset pulse outputted from the timer circuit 181. The reset pulse outputted from the timer circuit 181 is then inputted to the pulse duration measuring circuit 175 and the pulse counting circuit 173 to reset the accumulated period data and pulse counter number.

As explained above, when the accumulated period is 50 msec or less, the timer circuit 171 generates the reset pulse. When the accumulated period is 50 msec or more, the timer circuit 181 generates the reset pulse. Thereby, the number of timer circuits may be reduced to realize reduction in size of the circuit.

When the output signal of the output control circuit 182 is low level, power generation is stopped. It is also possible to realize the duty-control of the on/off conditions of the power transistor 61 by repeating the Low and high levels.

Moreover, it is also possible to use a gradual oscillation circuit for gradually increasing a duty ratio as the timer circuit 181 and output control circuit 182. The timer circuit 181 may be eliminated under the condition that a duty ratio preset with the gradual oscillation circuit is lowered to the predetermined value when the output of the pulse duration measuring circuit 175 rises and the predetermined duty ratio can be increased gradually. Generation of a high voltage pulse can be controlled effectively by gradually increasing the duty ratio. Since increase of power generation torque of the alternator can be controlled, a torque shock after re-start of power generation can be controlled. In addition, a counter, a capacitor, a resistor, a constant voltage circuit or the like forming the timer circuit 181 may be eliminated by deleting the timer circuit 181 and thereby an IC forming the voltage regulator can be reduced in size.

Fifth Embodiment

Next, an alternator 1 for a vehicle according to a fifth embodiment will be explained.

Figure 20:
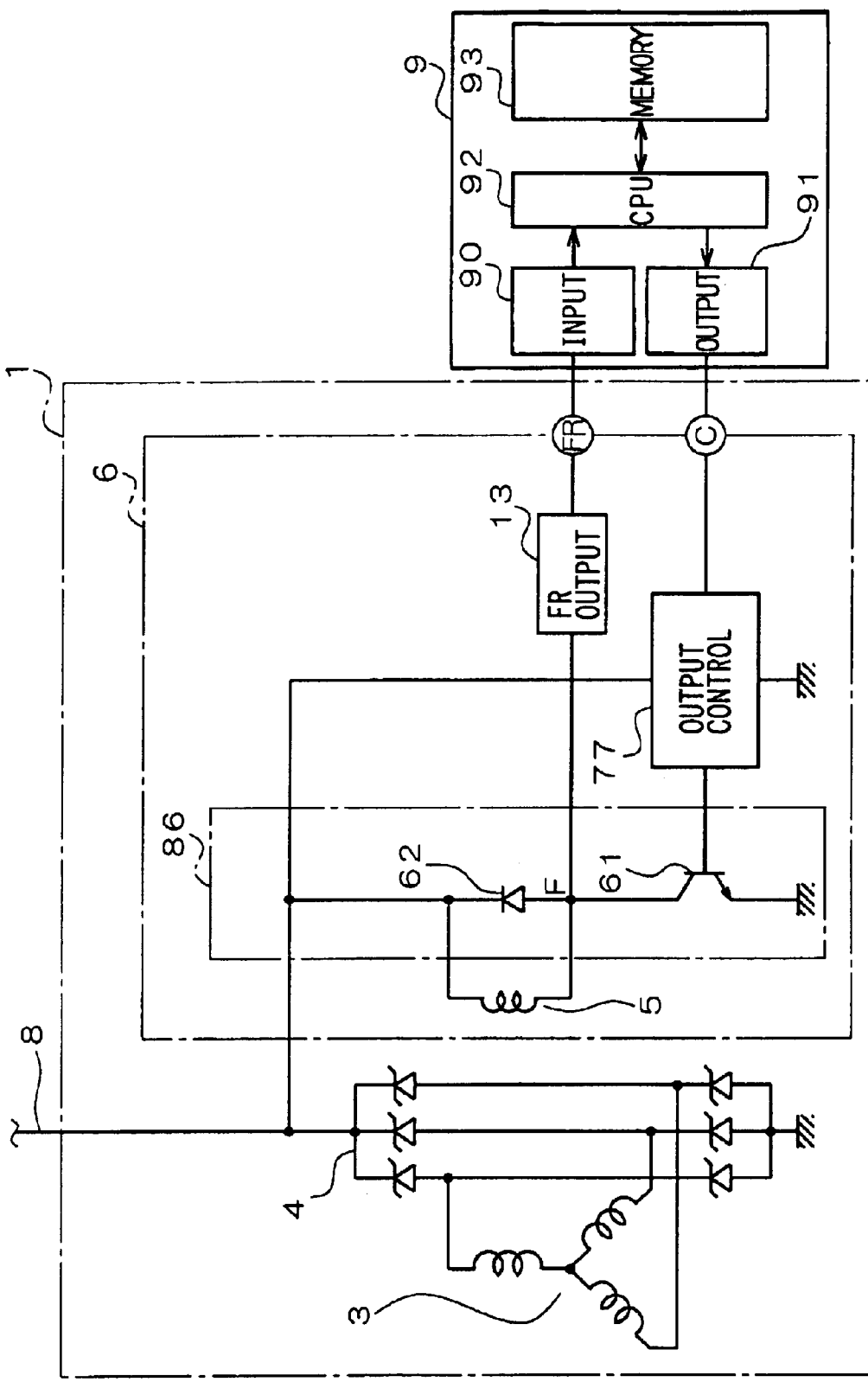
FIG. 20 is a circuit diagram showing a charging system using an alternator for a vehicle according to a fifth embodiment of the present invention.

FIG. 20 shows a charging system using the alternator 1 for of this embodiment. Unlike each embodiment explained above, this embodiment uses software to process a high voltage pulse detecting signal.

The alternator 1 is provided with an armature winding 3, a full-wave rectifier 4, a field winding 5 and a voltage regulator 6. This voltage regulator 6 is provided with a field current control circuit 86, an output voltage control circuit 77 and an FR signal output circuit 13.

The field current control circuit 86 includes a power transistor 61 and a flywheel diode 62 to control the field current flowing through the field winding 5. The power transistor 61 is connected at the base to the output terminal of the output voltage control circuit 77. It turns on when the signal inputted from this output terminal is in the high level. In this timing, the current flowing into the field winding 5 increases. The flywheel diode 62 is connected in parallel with the field winding 5 and flywheels the field current when power feeding to the field winding 5 is controlled to off condition.

The output voltage control circuit 77 sets the first regulated voltage (for example, 14.5V) when the signal inputted to the terminal C is high level and the second regulated voltage (for example, 12.8V) when the signal is low level to execute the on/off control of the power transistor 61.

The FR signal output circuit 13 outputs from the terminal FR a signal depending on the voltage waveform appearing at the connecting point F of the power transistor 61 and the flywheel diode 62.

The terminals C and FR of the voltage regulator 6 are connected to an external controller 9. This external controller 9 comprises an input circuit 90, an output circuit 91, CPU 92 and a memory 93. The predetermined process when a high voltage pulse is impressed to the alternator 1 is carried out by executing the predetermined program stored in the memory 93 with the CPU 92.

The signal outputted from the terminal FR of the voltage regulator 6 is inputted to the input circuit 90, and the predetermined process is executed with the CPU 92. Thereafter, a signal as the result of this process is then inputted to the terminal C of the voltage regulator 6 from the output circuit 91.

Here, when a high voltage pulse is applied to the output terminal of the alternator 1 due to a load cut-off condition or a connection failure on the power supply line 8, the power transistor 61 is turned off and a high voltage pulse is applied to the point F via the field winding 5. Therefore, the high voltage pulse is outputted to the terminal FR through the output terminal, field winding 5, FR output circuit 13 of the alternator 1.

Figure 21:
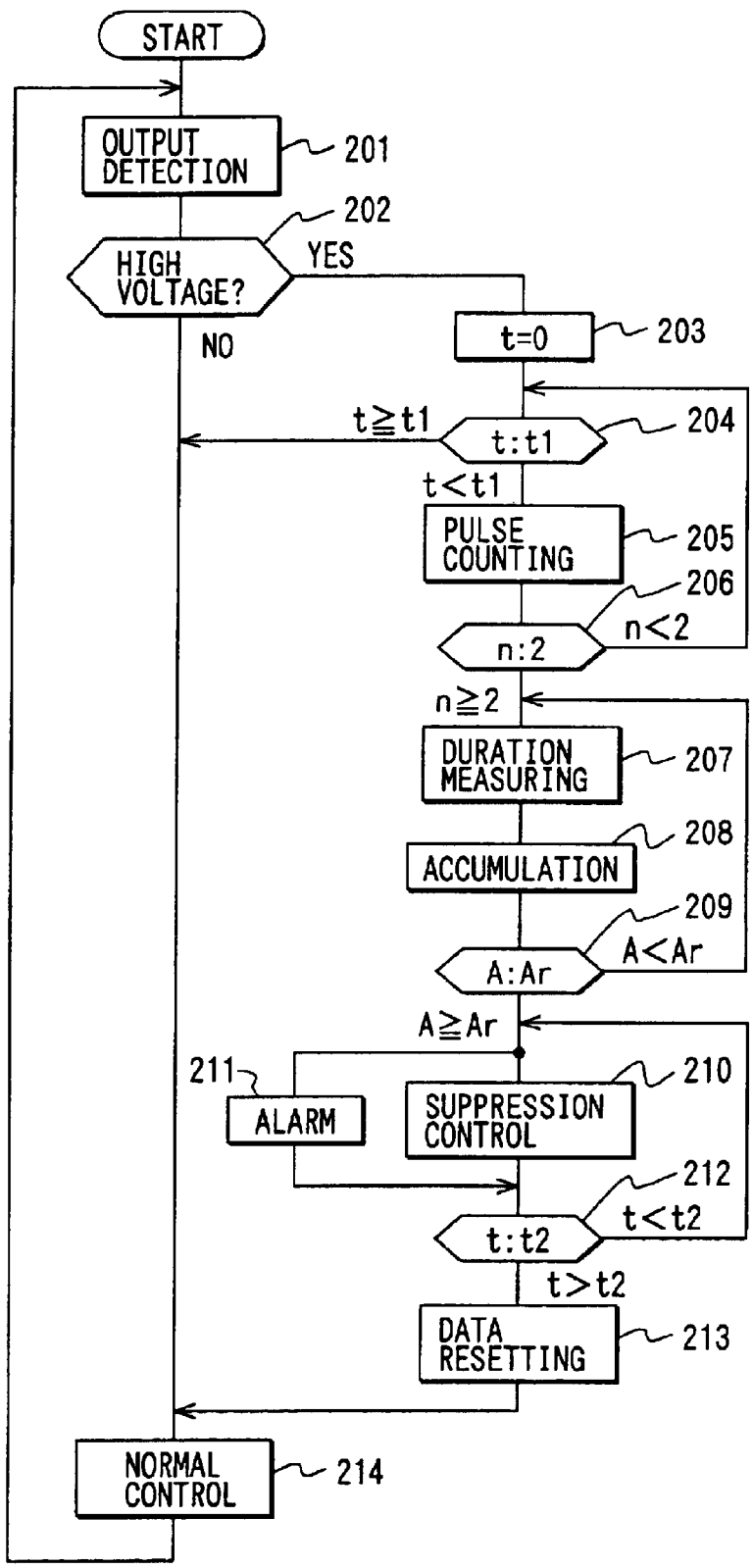
FIG. 21 is a flow diagram showing processing sequence of a CPU in an external controller.

Next, the high voltage pulse processing procedures within the external controller 9 will be explained. FIG. 21 is a flow diagram indicating the processing sequence of the CPU 92.

First, the CPU 92 detects the output terminal voltage of the alternator 1 based on the signal outputted from the terminal FR (step 201) to determine generation or not of a high voltage pulse (step 202). When the high voltage pulse is not generated, a negative determination is made. Thereafter, the CPU 92 outputs the high level signal to the terminal C to execute the normal power generation control (step 214), so that the regulated voltage is set to 14.5V. If the high voltage pulse is not generated, the processes of steps 201, 202, 214 are repeated.

When the high voltage pulse is applied to the output terminal of the alternator 1 due to load cut-off condition or connection failure of power supply line 8, positive determination is made (step 202). Next, the CPU 92 initially sets the operating time t of a first timer to 0 (step 203), and thereafter compares the timer measuring time t with the predetermined time t1 (step 204). When t<t1, the CPU 92 counts up the number of pulses n (step 205). Here, when the number of pulses n is smaller than 2 (step 206), the processes after step 204 are repeated.

When the timer measuring time t reaches the predetermined time t1, the process of step 204 shifts to that of step 214 to execute the normal power generation control.

When the operating time t of the timer is less than the predetermined value t1 and the number of pulses n is two or more (step 206), the CPU 92 measures the pulse duration (step 207) to calculate the accumulated period A (step 208). Next, the CPU 92 compares the accumulated period A with the predetermined time Ar (step 209). When the accumulated period A is smaller than the predetermined time Ar, the processes after step 207 are repeated.

Meanwhile, when the accumulated period A becomes larger than the predetermined time Ar, the CPU 92 issues the predetermined failure alarm (step 211) and transmits a signal of low level to the terminal C to conduct power generation control (step 210). This control is continued for the predetermined period t2 (for example, 1 sec) (step 212). In addition, when the predetermined period t2 has passed, the CPU 92 resets the pulse count number n, and the accumulated period A (step 213), and shifts to the normal power generation control (step 214).

The high voltage pulse appearing at the output terminal of the alternator 1 is detected as explained above. Particularly when a failure such as connection failure of the power supply line 8 is not generated, it is possible to discriminate the condition of single high voltage pulse generated when comparatively large capacitance electric load is disconnected with the condition of the high voltage pulses repeatedly generated irregularly within the short period when a contact failure is continuously generated because the power supply line 8 is not disconnected completely. Accordingly, when connection of the comparatively large capacity electric load is cut off, the output suppression control of the alternator 1 is not required as a response to such failure and thereby an unwanted drop of output voltage can be avoided.

Moreover, when a connection failure of the power supply line 8 is generated, the output of the alternator 1 is controlled to suppress generation of a high voltage pulse applied to the power Zener diode forming the full-wave rectifier 4. Thereby, temperature rise of power Zener diode can be suppressed effectively to prevent thermal breakdown.

In addition, since it is also possible to notify the driver of the generation of a failure on the power supply line 8 with the issuance of an alarm for the failure by discriminating the conditions of the high voltage pulses generated repeatedly, such a failure can be found quickly and irregular processes can also be prevented.

Moreover, in the structure of this embodiment, the existing system configuration can be used directly for the hardware of the voltage regulator 6 of the alternator 1. It can also be covered with an update of the software (program) to be executed in the CPU 92 of the external controller 9. Thereby, rise of costs due to system alteration can be minimized.

In this embodiment, the alternator 1 is isolated from the external controller 9, but these elements can also be integrated.

In this embodiment, the external controller 9 switches output voltage of the alternator 1 by sending a signal to the terminal C from the output circuit 91, but it is also possible to change the application condition of a load by sending an instruction for the switching of an electric load from the output circuit 91.

The present invention should not be limited to the disclosed embodiments and modifications, but may be implemented in various ways without departing from the spirit of the invention.

What is claimed is:

1. A voltage regulator for controlling an output voltage of an alternator having an armature winding, a field winding and a power supply line, comprising:

a switch means connected in series to the field winding for on/off-control of a field current fed to the field winding;

a flywheel circuit connected in parallel with the field winding for flywheeling the field current to the field winding when the switch means is turned off;

a failure detecting means for comparing the output voltage with a threshold and detecting a failure in the power supply line connected to an output terminal of the alternator when the output voltage exceeds the threshold; and a generation control means for controlling, upon detection of the failure in the power supply line, power generation of the alternator for a predetermined time that is longer than a time constant of the field winding to suppress the power generation which tends to cause a repetition of high voltage generation.

2. The voltage regulator as in claim 1, wherein the generation control means drives the switch means with a predetermined conductive rate that is smaller than that of the switch means when the failure in the power supply line is detected.

3. The voltage regulator as in claim 1, wherein the generation control means drives the switch means to maintain the output voltage of the alternator to a predetermined voltage that is smaller than a terminal voltage of an on-board battery.

4. The voltage regulator as in claim 1, wherein the generation control means fully turns off the switch means.

5. The voltage regulator as in claim 1, further comprising:

a rectifier constructed with a Zener diode having a reverse breakdown characteristic, wherein the failure detecting means detects an output voltage of the armature winding or a DC output voltage of the rectifier, and determines the failure when the detected voltage is larger than a regulated value of the output voltage of the alternator and exceeds a predetermined voltage that is smaller than a reverse breakdown voltage of the Zener diode and continues another predetermined time that is shorter than the time constant of the field winding.

6. The voltage regulator as in claim 1, further comprising:

an alarm means for issuing an alarm upon detection of the failure in the power supply line.

7. A voltage regulator for controlling an output voltage of an alternator having an armature winding, a field winding and a power supply line, comprising:

a switch means connected in series to the field winding for on/off-control of a field current fed to the field winding;

a flywheel circuit connected in parallel with the field winding for flywheeling the field current to the field winding when the switch means is turned off;

a failure detecting means for detecting a failure in the power supply line connected to an output terminal of the alternator; and a generation control means for controlling, upon detection of the failure in the power supply line, power generation of the alternator for a predetermined time that is longer than a time constant of the field winding to suppress the power generation, wherein the generation control means drives the switch means with a predetermined conductive rate that is smaller than that of the switch means when the failure in the power supply line is detected.

8. The voltage regulator as in claim 1, wherein the generation control means controls the power generation when the failure detecting means detects the failure a plurality of times.

* * * * *